US012037830B2

(12) United States Patent
D'Allesandro

(10) Patent No.: US 12,037,830 B2
(45) Date of Patent: Jul. 16, 2024

(54) COUNTERBALANCE ASSEMBLY AND SYSTEM

(71) Applicant: Southco Inc., Concordville, PA (US)

(72) Inventor: David Gaetano D'Allesandro, New York, NY (US)

(73) Assignee: Southco, Inc., Concordville, PA (US)

( * ) Notice: Subject to any disclaimer, the term of this patent is extended or adjusted under 35 U.S.C. 154(b) by 859 days.

(21) Appl. No.: 17/048,291

(22) PCT Filed: Apr. 17, 2019

(86) PCT No.: PCT/US2019/027863
§ 371 (c)(1),
(2) Date: Oct. 16, 2020

(87) PCT Pub. No.: WO2019/204431
PCT Pub. Date: Oct. 24, 2019

(65) Prior Publication Data

US 2021/0172230 A1 Jun. 10, 2021

Related U.S. Application Data

(60) Provisional application No. 62/767,555, filed on Nov. 15, 2018, provisional application No. 62/660,053, filed on Apr. 19, 2018.

(51) Int. Cl.
*E05F 1/08* (2006.01)
*E05F 1/10* (2006.01)
*E05F 1/12* (2006.01)

(52) U.S. Cl.
CPC .......... *E05F 1/1253* (2013.01); *E05F 1/1058* (2013.01); *E05Y 2201/416* (2013.01);
(Continued)

(58) Field of Classification Search
CPC ....... E05F 1/1058; E05F 1/1253; E05F 1/105; E05F 1/1041; E05F 1/1261; E05F 1/1075;
(Continued)

(56) References Cited

U.S. PATENT DOCUMENTS 938,952 A * 11/1909 Berg ........................ E05F 5/027 16/334
967,289 A * 8/1910 Adam ................... E05F 1/1066 16/72
(Continued)

FOREIGN PATENT DOCUMENTS

CA 2205719 A1 11/1997
CN 101368463 A 2/2009
(Continued)

OTHER PUBLICATIONS

International Search Report and Written Opinion for International Application No. PCT/US2019/027863, dated Jun. 26, 2019, 9 pages.

(Continued)

*Primary Examiner* — Chuck Y Mah
(74) *Attorney, Agent, or Firm* — Buchanan Ingersoll & Rooney PC

(57) ABSTRACT

According to one aspect of the invention, an assembly is configured to counterbalance components movable relative to one another, the assembly including a mounting bracket configured to be coupled to one of the components; a follower arm pivotally coupled to a follower arm mounting point on the mounting bracket; a follower coupled to a follower mounting point on the follower arm; means for exerting force between a force exerting means mounting point on the mounting bracket and a force exerting means mounting point on the follower arm; and a cam configured
(Continued)

to be coupled to another one of the components in such a way that the follower contacts a cam profile of the cam.

27 Claims, 20 Drawing Sheets

(52) U.S. Cl.
CPC ... *E05Y 2201/638* (2013.01); *E05Y 2201/696* (2013.01); *E05Y 2900/536* (2013.01); *E05Y 2900/608* (2013.01)

(58) Field of Classification Search
CPC ................. E05F 3/20; E05Y 2201/416; E05Y 2201/638; E05Y 2201/696; E05Y 2201/688; E05Y 2900/536; E05Y 2900/608; E05D 3/18; E05D 15/30; E05D 15/165
See application file for complete search history.

(56) References Cited

U.S. PATENT DOCUMENTS

| | | | | | | |
|---|---|---|---|---|---|---|
| 1,645,977 | A | * | 10/1927 | Titus | E05F 1/1253 16/80 |
| 2,743,476 | A | * | 5/1956 | Turner | E05D 3/06 16/289 |
| 3,457,584 | A | * | 7/1969 | Phelps | E05F 1/1261 16/290 |
| 3,683,454 | A | * | 8/1972 | Gronbach | E05F 1/1261 16/290 |
| 3,763,519 | A | * | 10/1973 | Favre | E05F 1/105 16/72 |
| 3,947,918 | A | * | 4/1976 | Favre | E05F 1/105 16/72 |
| 3,950,819 | A | * | 4/1976 | Little | E05F 1/1058 16/85 |
| 4,091,502 | A | * | 5/1978 | Little | E05D 11/1064 16/85 |
| 4,134,179 | A | * | 1/1979 | Silaghi | E05F 1/1276 180/69.21 |
| 4,621,391 | A | * | 11/1986 | Leonard | E05F 1/123 16/306 |
| 4,817,240 | A | * | 4/1989 | Sovis, Jr. | F24C 15/023 16/322 |
| 4,976,166 | A | * | 12/1990 | Davis | F02D 41/28 338/153 |
| 5,271,652 | A | * | 12/1993 | Watanabe | B62D 33/03 74/105 |
| 6,766,563 | B2 | * | 7/2004 | Lee | A23B 7/0425 16/335 |
| 7,810,213 | B2 | | 10/2010 | Brüstle | |
| 7,900,320 | B2 | * | 3/2011 | Katsumata | G03G 15/60 355/75 |
| 8,201,304 | B2 | * | 6/2012 | Steurer | E05F 1/1261 16/361 |
| 9,903,145 | B2 | * | 2/2018 | Huber | E05F 1/105 |
| 10,203,149 | B2 | | 2/2019 | Liu et al. | |
| 10,704,311 | B1 | * | 7/2020 | Collene | E05F 1/1261 |
| 10,769,884 | B2 | * | 9/2020 | Barbour | G06F 1/1601 |
| 2014/0145576 | A1 | * | 5/2014 | White | A47B 96/00 312/319.1 |
| 2016/0145922 | A1 | * | 5/2016 | Wickliffe | E05D 3/147 296/146.12 |
| 2017/0059176 | A1 | * | 3/2017 | SirLouis | E05D 3/02 |

FOREIGN PATENT DOCUMENTS

| | | | | |
|---|---|---|---|---|
| CN | 202718509 | U | | 2/2013 |
| CN | 104350227 | B | | 4/2016 |
| CN | 105672797 | A | | 6/2016 |
| CN | 106121426 | A | | 11/2016 |
| CN | 205976851 | U | | 2/2017 |
| DE | 1243561 | B | * | 6/1967 |
| EP | 1766173 | A1 | | 3/2007 |
| EP | 1865133 | A1 | | 12/2007 |
| JP | S59117781 | U | | 8/1974 |
| JP | H04130685 | U | | 11/1992 |
| JP | 1018707 | A | | 1/1998 |
| JP | H11334376 | A | | 12/1999 |
| JP | 2017514088 | A | | 6/2017 |

OTHER PUBLICATIONS

Chinese Office Action for Chinese Application No. 201980041540.5, dated Nov. 15, 2021, with translation, 16 pages.
Chinese Office Action for Chinese Application No. 2019800415405, dated Jun. 6, 2022 with translation, 17 pages.
International Preliminary Report on Patentability and Written Opinion for International Application No. PCT/US2019/027863, dated Oct. 20, 2020, 8 pages.
Indian Examination Report for Indian Application No. 202017048658, dated Mar. 28, 2022, with translation, 6 pages.
Japanese Notice of Reasons for Rejection for Japanese Application No. 2020-557935, dated Apr. 11, 2023 with translation, 6 pages.

* cited by examiner

COUNTERBALANCE ASSEMBLY AND SYSTEM

CROSS-REFERENCE TO RELATED APPLICATIONS

This is the U.S. National Phase Application of International Application No. PCT/US2019/027863, filed Apr. 17, 2019, which claims the benefit of priority of U.S. Provisional Application No. 62/660,053, filed on 19 Apr. 2018, entitled COUNTERBALANCE ASSEMBLY AND SYSTEM and U.S. Provisional Application No. 62/767,555, filed on 15 Nov. 2018, entitled COUNTERBALANCE ASSEMBLY AND SYSTEM, the contents of all of which are incorporated herein by reference in their entirety for all purposes.

BACKGROUND OF THE INVENTION

When managing the movement of two components with respect to one another, it is sometimes beneficial to employ a mechanism to counterbalance the components. This invention provides an assembly configured to counterbalance components movable relative to one another as well as a counterbalanced system including such components.

SUMMARY OF THE INVENTION

According to one aspect of the invention, an assembly is configured to counterbalance components movable relative to one another, the assembly including a mounting bracket configured to be coupled to one of the components; a follower arm pivotally coupled to a follower arm mounting point on the mounting bracket; a follower coupled to a follower mounting point on the follower arm; means for exerting force between a force exerting means mounting point on the mounting bracket and a force exerting means mounting point on the follower arm; and a cam configured to be coupled to another one of the components in such a way that the follower contacts a cam profile of the cam.

According to optional aspects of the assembly, the means for exerting force can be selected from the group consisting of a mechanical spring, a pneumatic spring, and a hydraulic spring. More than one of each of these springs may be used, or a combination of types of springs may also be used in the practice of this invention. Specifically, the means for exerting force can be one mechanical spring, or can be two more such springs. More specifically, a mechanical spring such as a compression spring or springs can be interposed between the mounting point on the mounting bracket and the mounting point on the follower arm. The assembly can also include a spring guide associated with and positioned to guide each spring. The cam profile can include a detent, and the follower can include a roller.

According to another aspect of the invention, a counterbalanced system includes components movable relative to one another and at least one assembly counterbalancing the components relative to one another. The at least one assembly has a mounting bracket coupled to one of the components, a follower arm pivotally coupled to a follower arm mounting point on the mounting bracket, a follower coupled to a follower mounting point on the follower arm, means for exerting force between a force exerting means mounting point on the mounting bracket and a force exerting means mounting point on the follower arm, and a cam coupled to another one of the components in such a way that the follower contacts a cam profile of the cam. The at least one assembly facilitates movement of the components relative to one another.

According to optional aspects of the counterbalanced system, one of the components can be a vehicle panel. Also, the vehicle panel can include a vehicle hood. Additionally, one of the components can be oriented at an angle with respect to a horizontal plane in a first position and movable relative to the other one of the components to be oriented at a smaller angle with respect to the horizontal plane in a second position. The component oriented at the angle with respect to the horizontal plane in the first position can be oriented substantially vertically. Also, the components can be pivotally coupled relative to one another in addition to being coupled by the at least one assembly.

According to other optional aspects of the counterbalance system, non-limiting examples of one of the components include: a copier lid; a printer lid; medical equipment; diagnostic equipment; a cover for industrial machinery; a food preparation machine such that machinery can be moved out of the way when not in use; a fold-up or fold-down work surface; a flip-up counter such as those in restaurants, bars and other venues; a cover for an armored vehicle hatch such as a hatch on a tank; tiltable displays for gaming machines or gaming systems or other video systems; and any other application in which one component is coupled for movement with respect to another component in a controlled manner with perceived weight management.

DETAILED DESCRIPTION OF THE INVENTION

Figure 1:
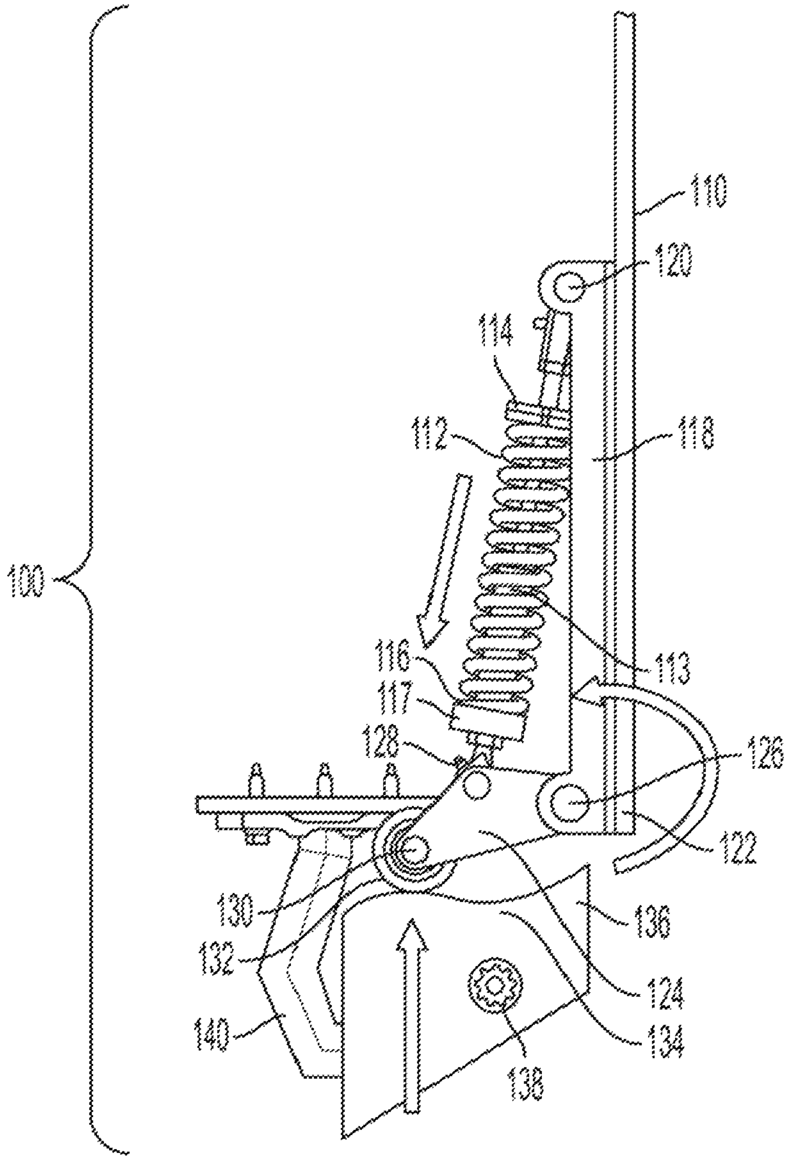
FIG. 1 is side view of an exemplary embodiment of the invention in a first configuration.

Although the invention is illustrated and described herein with reference to specific embodiments, the invention is not intended to be limited to the details shown. Rather, various modifications may be made in the details within the scope and range of equivalents of the claims and without departing from the invention.

It is to be understood that if the same reference numbers are applied to different embodiments, that the part number to which the reference number refers is the same or similar for the each embodiment, i.e., part number 112 refers to a spring in each of the six exemplary embodiments described below.

Generally, a counterbalance mechanism is provided by this invention, including embodiments utilizing a compression spring or springs (or other compressive force device such as a pneumatic cylinder, an air spring or other means for exerting force) acting on a follower arm in combination with a customizable cam profile generating a counter acting force to the center of gravity of a system (e.g., a truck hood, a door, etc.). In one aspect of the invention, a vertically mounted mechanism is provided to counterbalance and/or provide a customizable opening profile to a system having multiple components. This is achieved by utilizing a compressive force coupled to a cam and a follower that work in conjunction with the system, which applies a counteracting force to the weight of the system about its point of rotation.

An overall advantage of orienting this system vertically, as one option, is that less space is taken up by the counterbalance components, compared to the use of a horizontal counterbalance rod system, or even a single torque rod. This additional space due to the vertically mounted counterbalance system can allow clearance for adding other equipment and components to the system where the inventive device is used. An example of such a component is a snowplow, for instance. If the system is used for example on the hood for a vehicle, there is also additional space to facilitate maintenance of the engine compared to a horizontally mounted counterbalance system.

The compression device is preloaded to a set force. Throughout any infinite number of points throughout the travel of the system, that force is amplified or minimized as the follower translates (e.g., rolls, slides etc.) over the cam profile. The relationship between the point at which the cam profile acts on the follower and the point at which the compressive force acts on the follower creates the counteracting force relative to the point of rotation in the overall system.

The system, as shown and illustrated in various embodiments herein, utilizes a fixed cam attached to a non-moving section of a system (e.g., a truck frame, a doorframe, etc.), and the compression spring counterbalance is attached to the rotating part of the system (e.g., a truck hood, a door, etc.).

The system is infinitely customizable, which means that depending on the particular design of the cam profile a truck hood (or other movable element such as the display for a gaming machine) can be designed to open automatically or be partially or even perfectly counterbalanced (made to feel weightless throughout the motion). The moveable element can thus be made to feel like any possibility of desired weight when moved.

The system can also be mounted in the reverse configuration where the compression force counterbalance would be fixed and the cam profile would be attached to the rotating or movable part of the system. The system can also be designed to include a hinge or used in conjunction with an external hinge system.

The counterbalance assembly is shown in accordance with several exemplary embodiments in the Figures. It should be understood that the counterbalance assembly can be utilized in a variety of applications. Non-limiting examples of applications are vehicle hoods, such as on trucks or cars, heavy doors or lids of containers or compartments, either in a vehicle or in other applications which require the use of heavy doors or covers that need to be periodically opened and closed, such as lids on a dumpster, bulkhead doors, etc. Also, this invention can be used for any application in which the perceived weight of a component is modified (decreased or increased) at any point along its movement relative to another component.

It should be also understood that a single application, for instance a truck hood, can utilize one or more of the counterbalance assemblies or mechanisms described herein in order to facilitate opening or closing the hood.

In the present examples the counterbalance mechanism is incorporated on a vehicle hood, in which the front of the hood when in the closed position is generally vertical, and when pulled open from the top or otherwise moved toward an open position, rotates to a more horizontal position, such that engine of the vehicle is accessible. In this example, the compression device is a compression spring, but it can be appreciated by those with skill in the art that any such compression device (e.g., a member that is designed to provide compression) could also comprise a pneumatic cylinder or an air spring, or a hydraulic device, as non-limiting examples. The spring can be a helical spring. It should be also be appreciated that the counterbalance mechanism can utilize a single compression device, for instance one spring, as shown in the first exemplary embodiment, or more than one compression device, such as the two springs shown in the second exemplary embodiment. In addition, as shown in the fourth exemplary embodiment, the force exerted by the compression device may be adjustable. Such adjustability is exemplified as the compression spring shown in the fourth embodiment in which a preload on the compression spring is adjustable by a screw, for instance.

Referring generally to the figures, and according to one aspect of the invention, a counterbalance assembly 100 is configured to counterbalance components movable relative to one another, the assembly 100 including a mounting bracket 118 configured to be coupled to one of the components; a follower arm 124 pivotally coupled to a follower arm mounting point 126 on the mounting bracket 118; a follower 132 coupled to a follower mounting point 130 on the follower arm 124; means for exerting force between a force exerting means mounting point 120 on the mounting bracket 118 and a force exerting means mounting point 128 on the follower arm 124; and a cam 136 configured to be coupled to another one of the components in such a way that the follower 132 contacts a cam profile 134 of the cam 136.

According to optional aspects of the assembly, the means for exerting force can be selected from the group consisting of a mechanical spring, a pneumatic spring, and a hydraulic spring. One spring or a plurality of springs can be used as a means for exerting force. Specifically, the means for exerting force can be a mechanical spring. More specifically, a mechanical spring such as a compression spring or springs 112 can be interposed between the mounting point 120 on the mounting bracket 118 and the mounting point 128 on the follower arm 124. The assembly 100 can also include a spring guide 113 positioned to guide the spring 112. The cam profile 134 can include a detent, and the follower 132 can include a roller 132. If more than one spring 112 is used, each can have an associated cam profile 134, follower 132, e.g. a roller 132, or the more than one spring 112 can be associated together with a common cam profile 134, follower 132 such as a roller 132. The cam profile(s) 134 and the spring(s) 112 are selected so as to produce the desired counterbalance force as needed for the particular application.

According to another aspect of the invention, a counterbalanced system includes components movable relative to one another and at least one assembly 100 counterbalancing the components relative to one another. The at least one assembly 100 has a mounting bracket 118 coupled to one of the components, a follower arm 124 pivotally coupled to a follower arm mounting point 122 on the mounting bracket 118, a follower 132 coupled to a follower mounting point 130 on the follower arm 124, means for exerting force between a force exerting means mounting point 120 on the mounting bracket 118 and a force exerting means mounting point 128 on the follower arm 124, and a cam 136 coupled to another one of the components in such a way that the follower 132 contacts a cam profile 134 of the cam 136. The at least one assembly 100 facilitates movement of the components relative to one another.

According to optional aspects of the counterbalanced system, one of the components can be a vehicle panel. Also, the vehicle panel can include a vehicle hood 110. Additionally, one of the components can be oriented at an angle with respect to a horizontal plane in a first position and movable relative to the other one of the components to be oriented at a smaller angle with respect to the horizontal plane in a second position. The component oriented at the angle with respect to the horizontal plane in the first position can be oriented substantially vertically. Also, the components can be pivotally coupled relative to one another in addition to being coupled by the at least one assembly.

Referring specifically to FIG. 1, which shows a side view of counterbalance assembly 100 mounted to the front of a hood 110, FIG. 1 shows the hood 110 in the vertical position and therefore the hood 110 is closed. The counterbalance assembly 100 is constructed and arranged to pivotally connect the hood 110 to the truck frame (not shown).

The counterbalance assembly 100 comprises a compression spring 112. Although the assembly 100 is shown with a single spring 112, it should be understood that there could be a plurality of springs 112. As shown in FIG. 1, the spring 112 has an optional internal spring guide 113, which is constructed and arranged to shorten or lengthen as needed, according to the changing length of the spring, as the compression spring 112 is subjected to more or less compressive force. The spring guide 113 is a telescoping assembly that can expand or retract while guiding the shape of the compression spring 112 to extend along a spring axis. The compression spring 112 has a spring top end 114 and a spring bottom end 116. Note that the spring bottom end 116 has been illustrated as contacting a nut 117. The spring guide 113 and the nut 117 are mutually threaded, so that the nut 117 can be moved up or down the shaft of the spring guide 113. This movement of the nut 117 serves to add or subtract compression to the spring 112, which adjusts the pre-load on the spring 112, thereby providing adjustability to the force that the spring 112 exerts to counterbalance the force of gravity.

The spring top end 114 is pivotally coupled to a spring mounting bracket 118. The spring mounting bracket 118 is fixedly mounted to an interior surface of the hood 110. The spring mounting bracket has a top end 120 and a bottom end 122.

Although not shown in this view, a wire may optionally be threaded through the center of spring 112, parallel to the spring guide 113. The wire can be attached to the spring mounting bracket 118, to provide an additional measure of safety in the event that the spring 112 breaks or comes loose from the spring mounting bracket 118. Such a wire may be optionally added to any of the embodiments 100, 200, 300, 400, 500, 600 disclosed herein.

As shown in FIG. 1, the spring top end 114 is thus pivotally mounted to the spring mounting bracket top end 120. The spring bottom end 116 is pivotally coupled to a follower arm 124. The follower arm 124 has three mounting points. These are generally described as a front mounting point 126, a top mounting point 128, and a back mounting point 130. The directions are in reference to the truck, i.e., front is towards the front of the truck, back is towards the back of the truck, and top is towards the top of the truck.

The front follower arm mounting point 126 is pivotally coupled to the spring mounting bracket bottom 122. The spring bottom end 116 is pivotally coupled to the top mounting point 128. The back mounting point 130 is rotatably coupled to a follower 132. The follower 132 is in contact with a profile 134 of a cam 136. While not shown in FIG. 1, the profile 134 can optionally comprise a detent or other surface contour, such as an indent, which would serve to hold or urge the follower 132 in a fixed or stable position, thereby allowing the hood 110 to remain fixed or stable in a position partway between fully opened and fully closed, while still allowing the follower 132 to travel along the profile 134 and thus the hood 110 to be easily moved toward the open or closed position from the position partway between fully opened and fully closed. Additionally, more than one such surface contour can be provided to facilitate stable positioning at multiple intermediate positions.

The follower 132 in this embodiment is shown as a rotating disc or a wheel such as the outer surface of a bearing, but it should be understood that the follower 132 could be merely a sliding element, that could optionally be provided with a friction-reducing coating, or another form of cam follower. The cam 136 is fixedly mounted to the truck frame (not shown). Also shown FIG. 1 is cam hinge point 138 and an optional J-bracket 140 extending between the hood and the pivot point.

Figure 2:
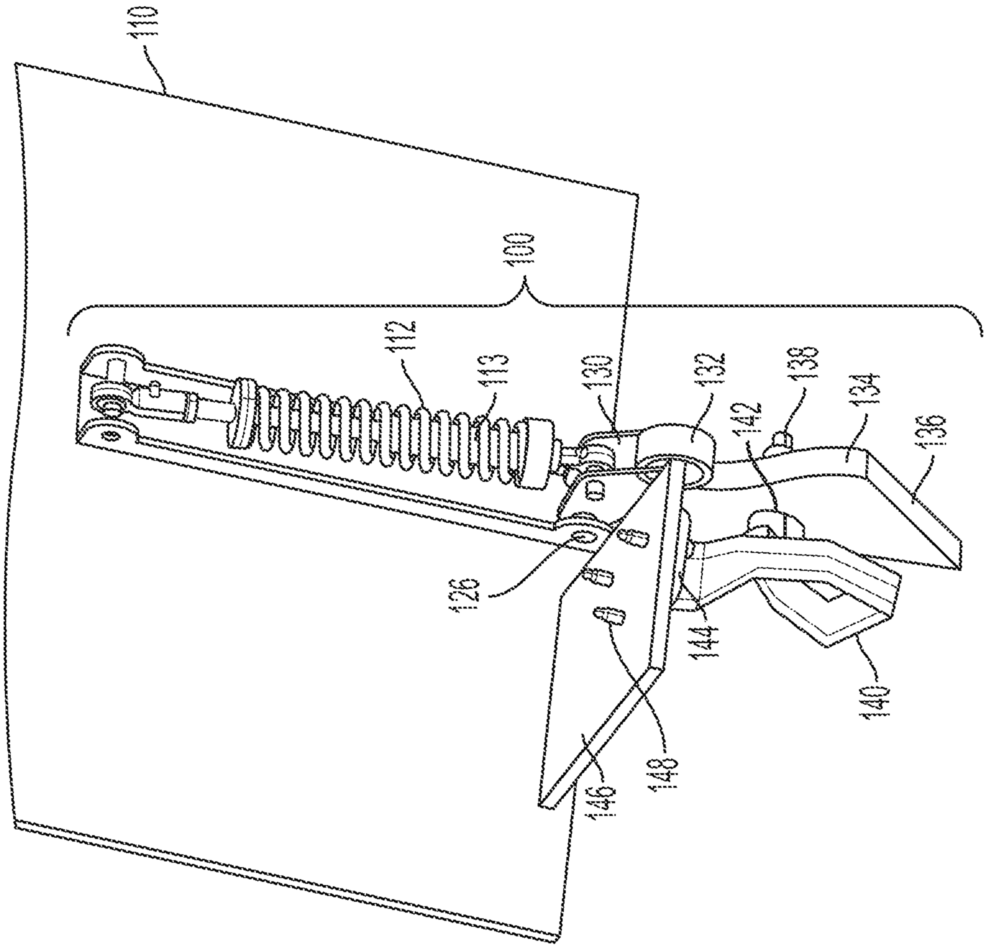
FIG. 2 is a perspective view of the exemplary embodiment of the invention shown in FIG. 1.
Figure 10:
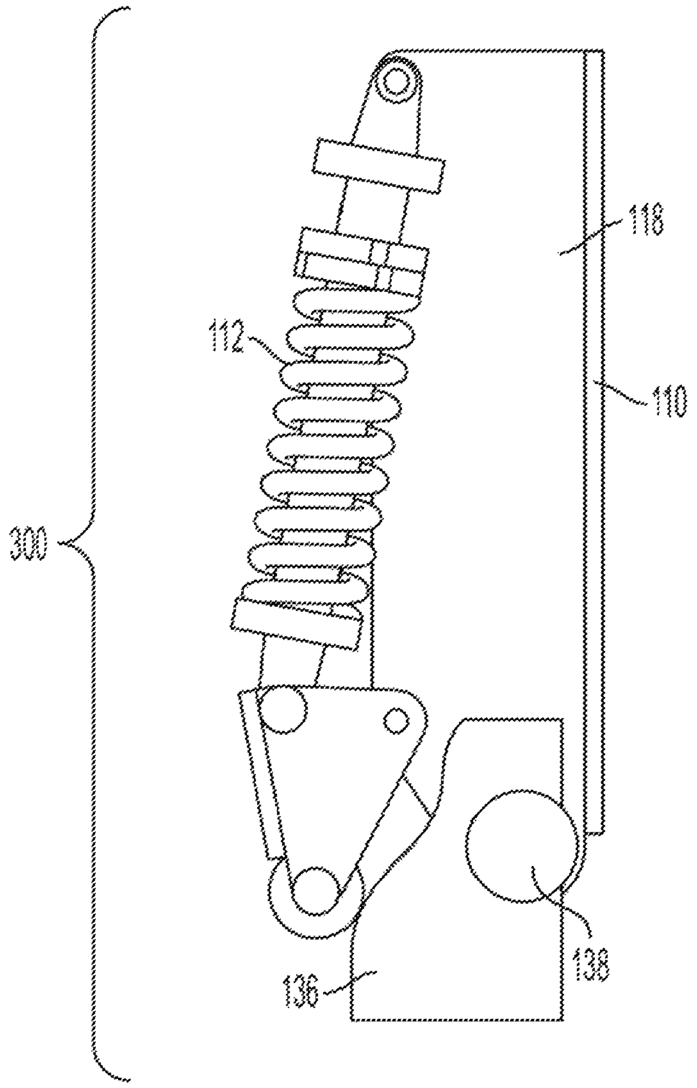
FIG. 10 is a side view of a third exemplary embodiment of the invention.
Figure 11:
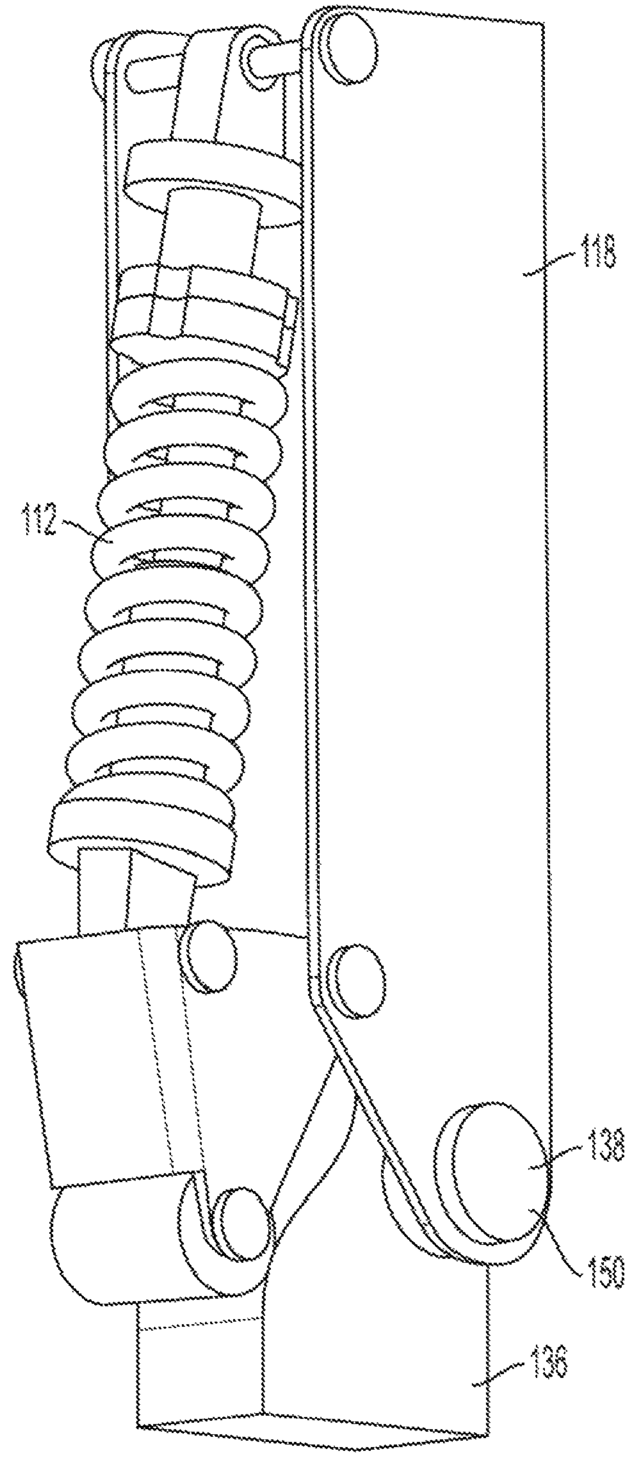
FIG. 11 is a perspective view of the third exemplary embodiment of the invention.

Turning to FIG. 2, the J-bracket 140 is shown more clearly, in relation to the hood 110 and the cam 136. The J-bracket 140 is pivotally coupled at its front end 142 to the cam 136 at the cam hinge point 138. The J-bracket 140 is fixedly mounted at its back end 144 to a mounting plate 146. As shown in FIG. 2, the J-bracket back end 144 is mounted to the mounting plate 146 using bolts 148. The mounting plate 146 is fixedly attached to the hood, 110. The part 110 may be any other pivotal part of a system such as: a copier lid; a printer lid; medical equipment; diagnostic equipment; a cover for industrial machinery; a food preparation machine such that machinery can be moved out of the way when not in use; a fold-up or fold-down work surface; a flip-up counter such as those in restaurants, bars and other venues; a cover for an armored vehicle hatch such as a hatch on a tank; tiltable displays for gaming machines or gaming systems or other video systems; and any other application in which one component is coupled for movement with respect to another component in a controlled manner with perceived weight management, as non-limiting examples. The attachment of the mounting plate 146 to the hood 110, or other of the non-limiting examples may be accomplished by any suitable means, for instance, welding or fasteners such as bolts. It should be understood that while a J-bracket 140 is shown, any suitable mounting device can be used and the cam hinge point 138 on the cam 136 could be merged with the spring mounting bracket 118. This embodiment is shown in FIGS. 10 and 11, which are discussed below.

Figure 3:
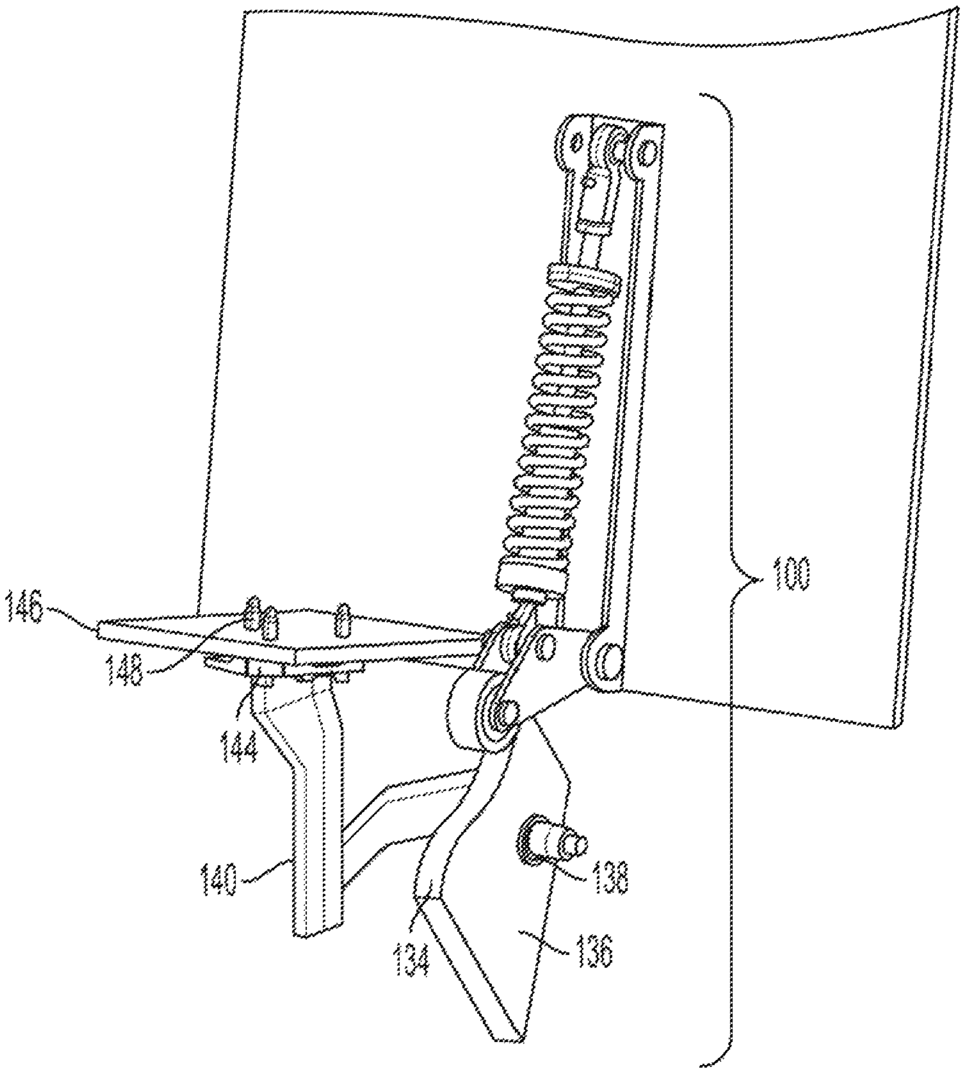
FIG. 3 is another perspective view of the exemplary embodiment of the invention shown in FIG. 1.
Figure 4:
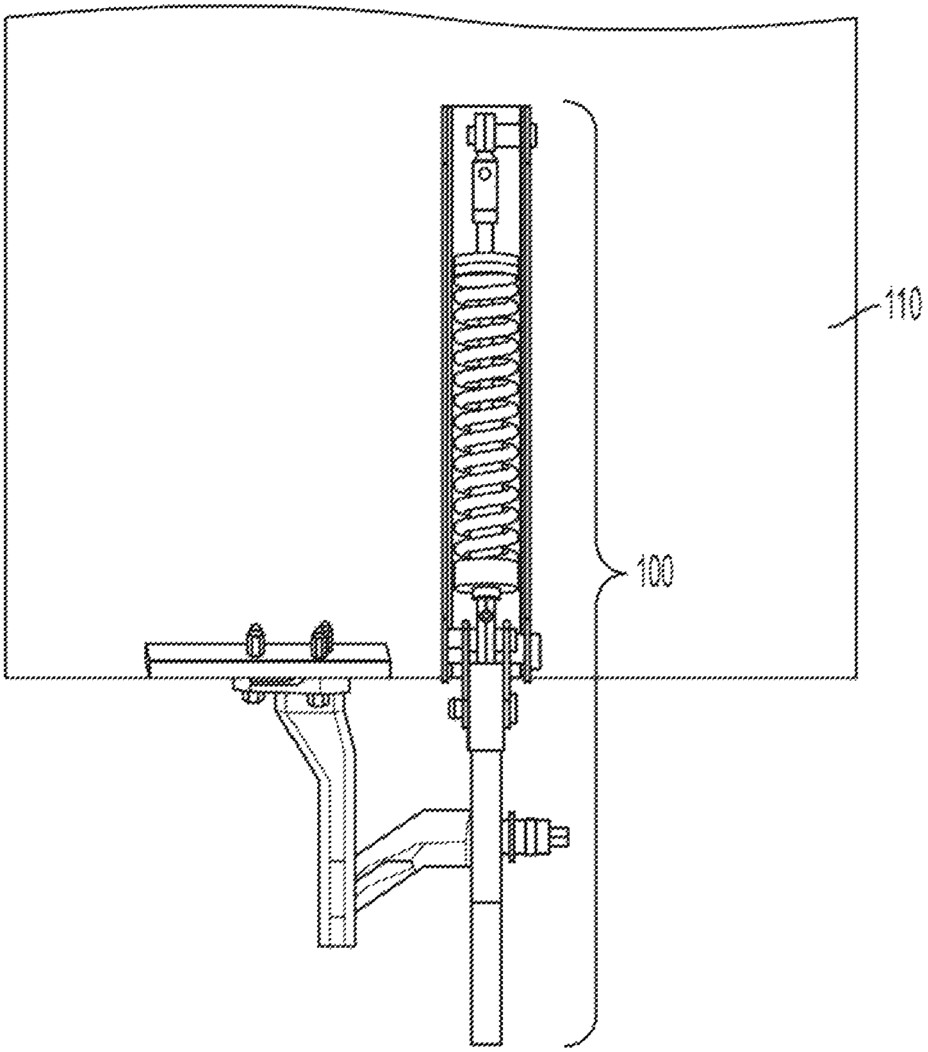
FIG. 4 is a rear view of the exemplary embodiment of the invention shown in FIG. 1.

FIG. 3 shows a slightly different perspective view of the counterbalance assembly 100, wherein the J-bracket 140 as mounted to the mounting plate 146 is shown more clearly. FIG. 4 shows a rear view of the counterbalance assembly 100 as mounted on the hood 110.

Figure 5:
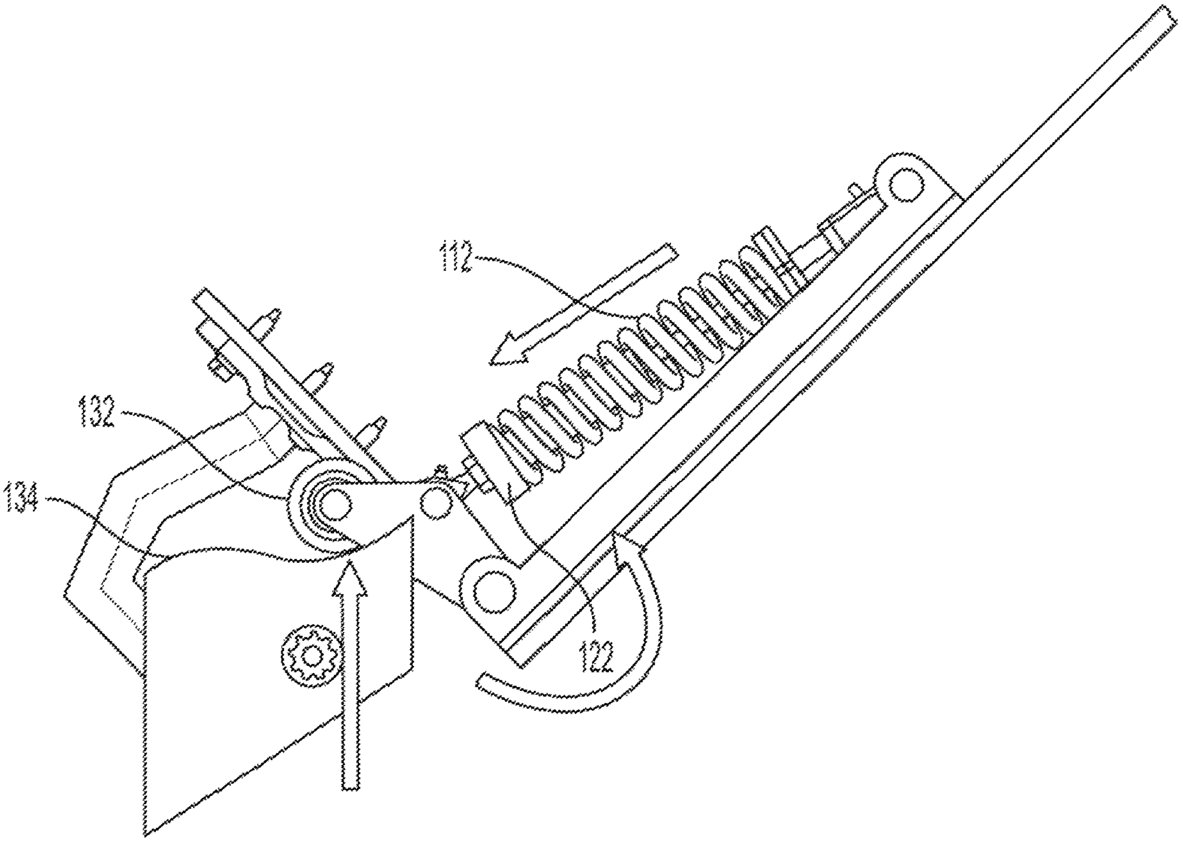
FIG. 5 is a side view of the exemplary embodiment of the invention shown in FIG. 1, in another configuration.
Figure 6:
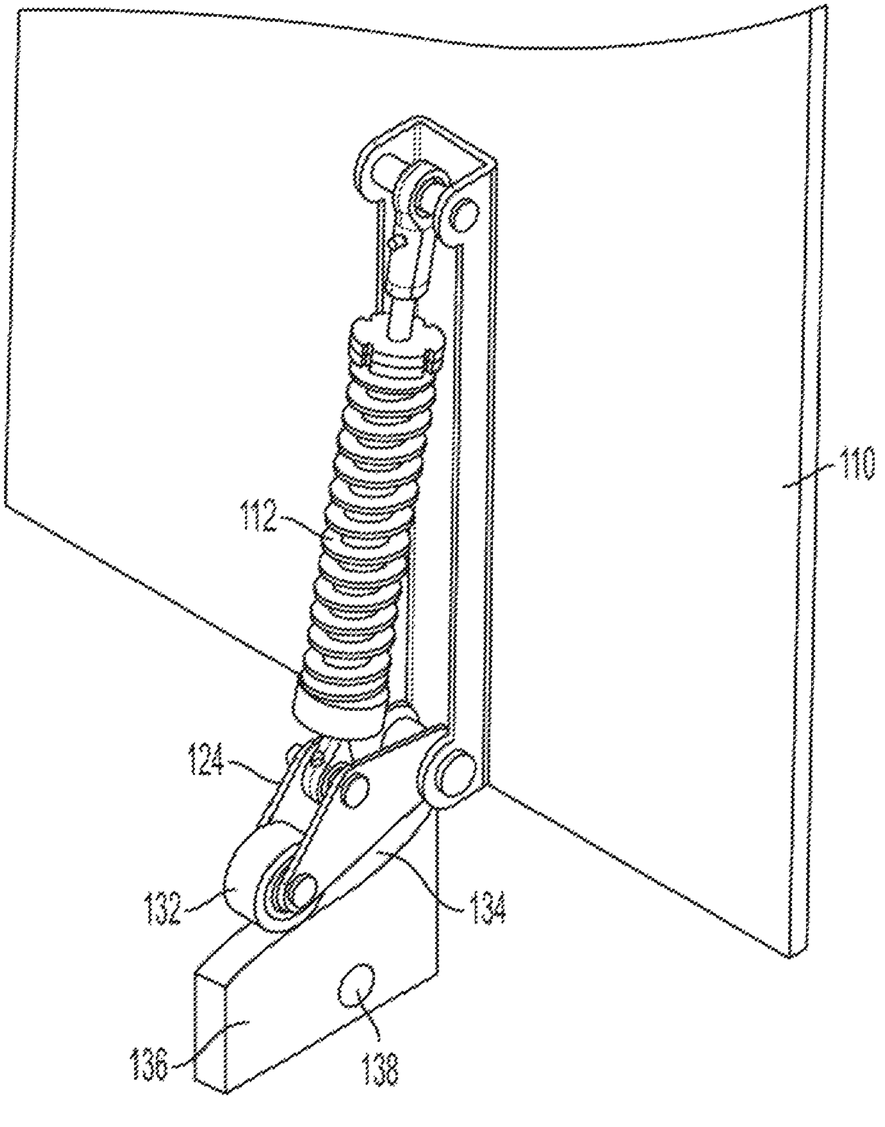
FIG. 6 is another perspective view of the exemplary embodiment of the invention shown in FIG. 1.
Figure 7:
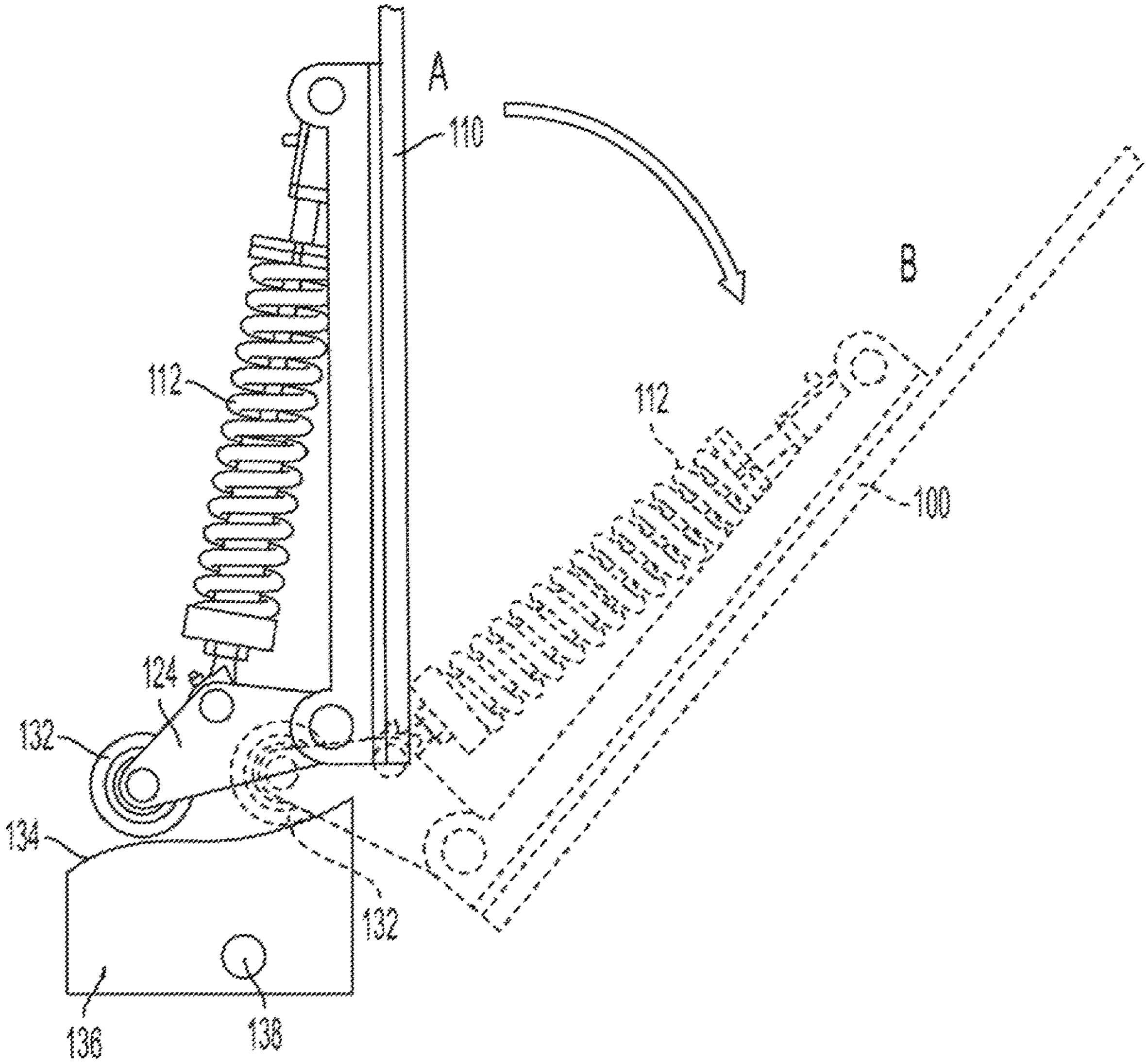
FIG. 7 is a side view showing the movement of the exemplary embodiment of the invention shown in FIG. 1.

The mechanism of action of the counterbalance assembly 100 is explained by examining FIG. 5 and FIG. 6 as well as FIG. 7. FIG. 6 shows the counterbalance assembly 100 in the closed position, wherein the hood 110 is vertically disposed.

Looking closely at FIG. 6, it should be appreciated that the cam profile 134 has a particular contour, or shape. The compression spring 112 is constructed and arranged such that it continually exerts a force on the follower arm 124 and therefore the follower 132 is continually pressed against the cam profile 134. The length and structure of the compression spring 112, and therefore the amount of force from the compression spring 112, is dictated by the position of the follower 132 and follower arm 124. The shape of the cam profile 134 determines the position of the follower 132 and the follower arm 124, and therefore the force from the compression spring 112, which counteracts the moment caused by pivoting the hood 110 from the open or the closed position, which can therefore be varied depending on the shape of the cam profile 134.

As can be seen in FIG. 7, which shows the front of the hood 110 in the closed or more vertical position A, as well as in the open, or more horizontal position B in broken lines, one can see that the follower 132 has moved along the cam profile 134, and as it does so, the force applied by the compression spring 112 can be varied depending on the shape of the cam profile 134.

The compression spring 112 is preloaded to a set force. As noted in this detailed description, this preloaded set force may be adjusted or rendered adjustable, either during manufacture, assembly, or use of the counterbalance system. Throughout any infinite number of points throughout the rotation of the counterbalance assembly 100 caused by the movement of the hood 110, that force is amplified or minimized as the follower 132 translates (e.g., rolls, slides, etc.) over the cam profile 134. The relationship between the point at which the cam profile 134 acts on the follower 132 and the point at which the compressive force from the compression spring 112 acts on the follower 132 creates the counteracting force relative to the point of rotation in the overall counterbalance assembly 100, which is the hinge point 138 on the cam 136.

The counterbalance assembly 100, as shown, utilizes a fixed cam 136 that is attached to the non-moving section of a system. The non-moving part could be a truck frame as shown above, but could also be a doorframe, for instance. As explained above, the compression spring counterbalance assembly 100 is thus attached to the rotating part of the system (e.g., truck hood, door), but a person skilled in the art can readily appreciate that the operation of the counterbalance assembly 100 could easily be reversed wherein the fixed cam 136 is attached to the rotating part (e.g., hood, door, etc.) and the movable elements (the compression spring 112, follower arm 124 and follower 132) are attached to the truck frame, for instance. A person skilled in the art can also understand that the counterbalance assembly 100 as described herein can be used in conjunction with an external hinge system, or the counterbalance assembly 100 as described can itself also include a hinge element.

The counterbalance assembly 100 is infinitely customizable depending on the design of cam profile 134, and a hood 110 or other component could be designed to open automatically or be partially or even perfectly counterbalanced (made to feel lighter or weightless throughout all or part of the motion) or any possibility of desired weight. For example, as noted above, the cam profile 134 can comprise an optional detent (not shown), whereby by the hood 110 can be left partially opened, without having to exert force to hold the hood 110 in a partially open position.

Figure 8:
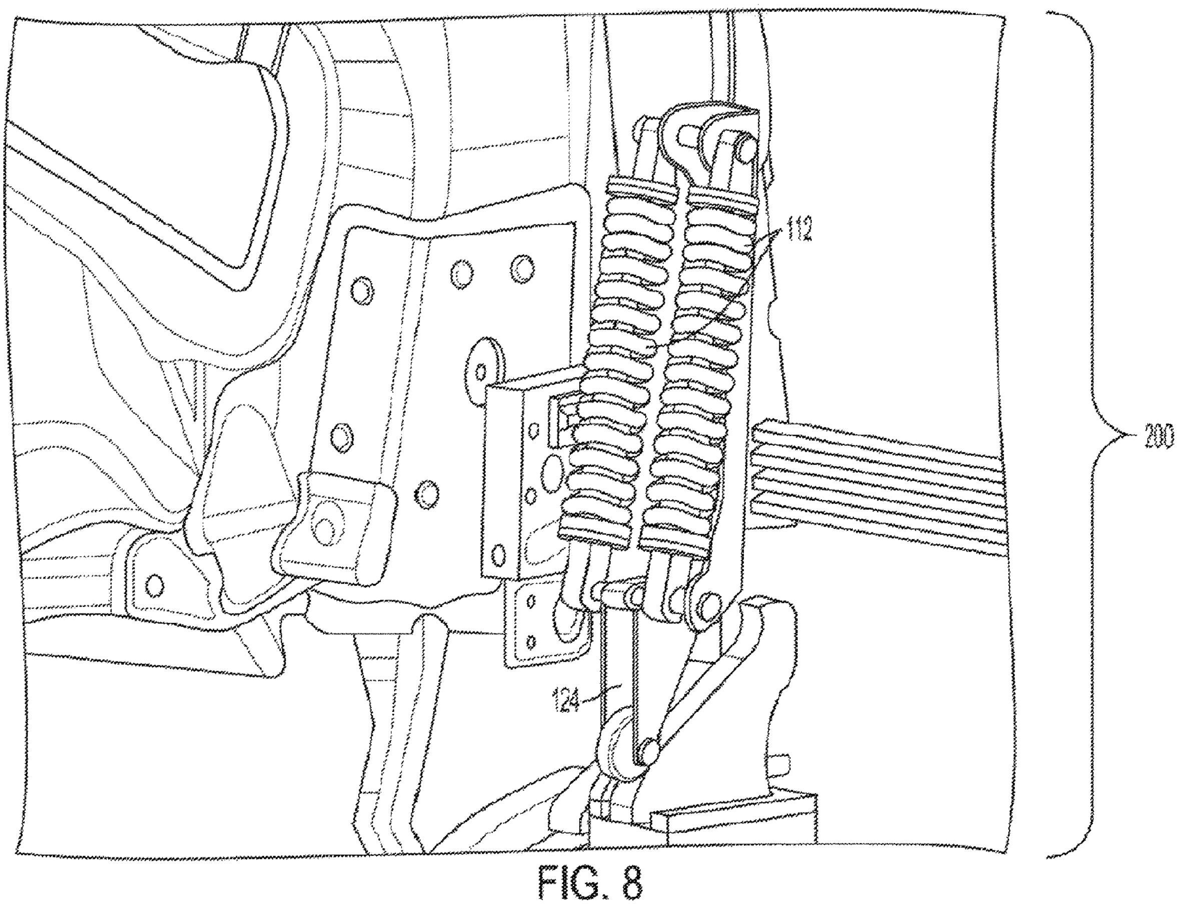
FIG. 8 is a perspective view of a second exemplary embodiment of the invention.

FIG. 8 shows a second embodiment of a counterbalance assembly 200, which operates in substantially the same way as the first embodiment of the counterbalance assembly 100. The counterbalance assembly 200 has a second compression spring 112. The second spring 112 is attached to the same follower arm 124 as the other compression spring 112. The operation of the second embodiment counterbalance assembly 200 is otherwise the same as the first embodiment 100.

Figure 9:
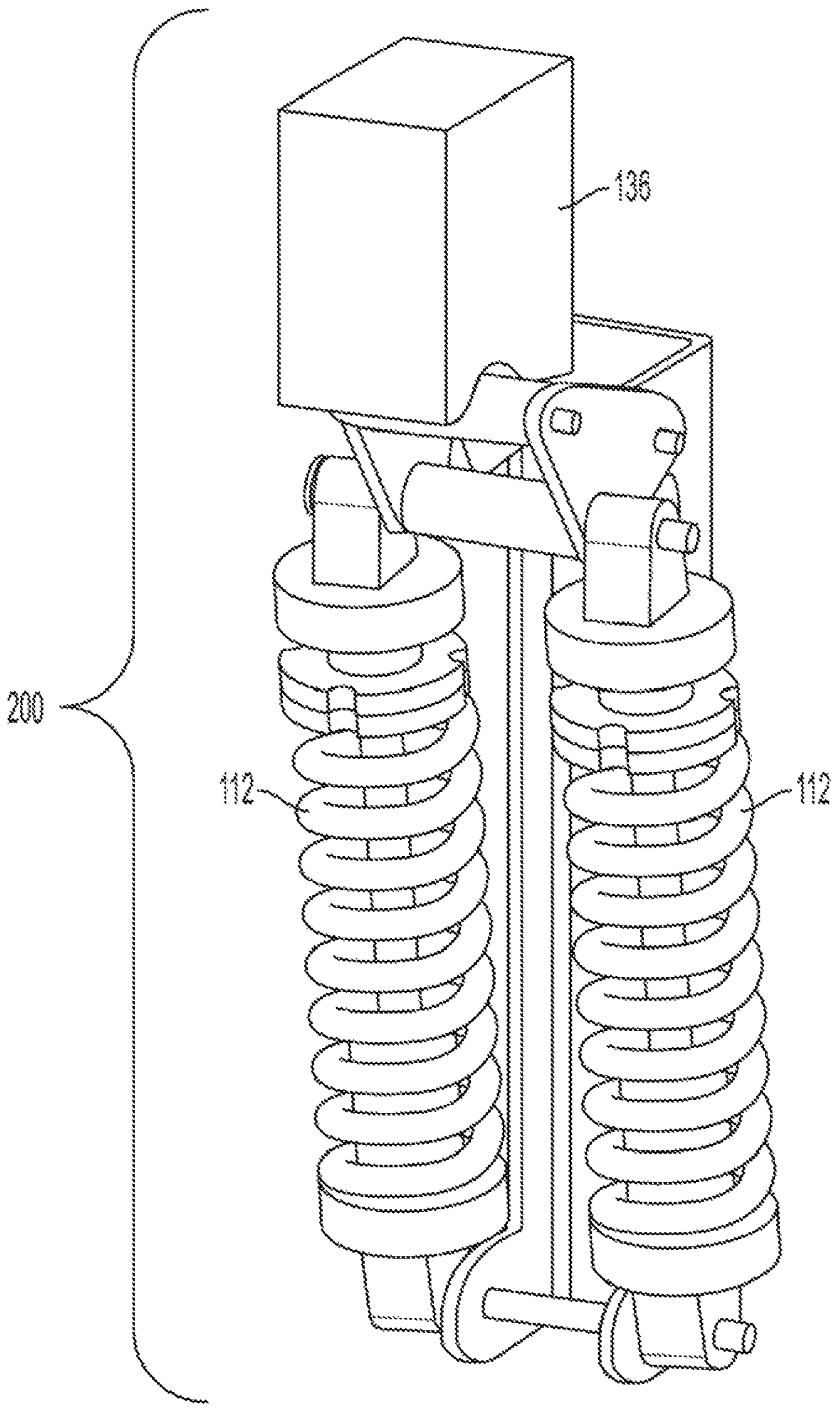
FIG. 9 is another perspective view of the second exemplary embodiment of the invention.

FIG. 9 shows another view of counterbalance assembly 200. In this view, it can be appreciated that the counterbalance assembly 200 (and also, of course the first embodiment assembly 100, which has a single spring) can be mounted in any orientation, i.e., as shown in FIG. 9, the cam 136 is above the springs 112. Further, it can be seen more clearly in FIG. 9 that the optional spring guide 113, has been omitted from each spring 112.

FIG. 10 shows a side view of a third embodiment of a counterbalance assembly 300 which, like the first embodiment 100, has one spring 112. In addition, in this embodiment, it can be seen that the optional J-bracket 140 has been omitted. Significantly, the hinge point 138 has been merged with the spring mounting bracket 118, which is mounted on the hood 110.

FIG. 11 shows a perspective view of the third embodiment of the counterbalance assembly 300. In this view, it can be seen that the hinge point 138 comprises an axle 150 that is configured and arranged to rotatably couple the spring mounting bracket 118 to the cam 136.

Figure 12:
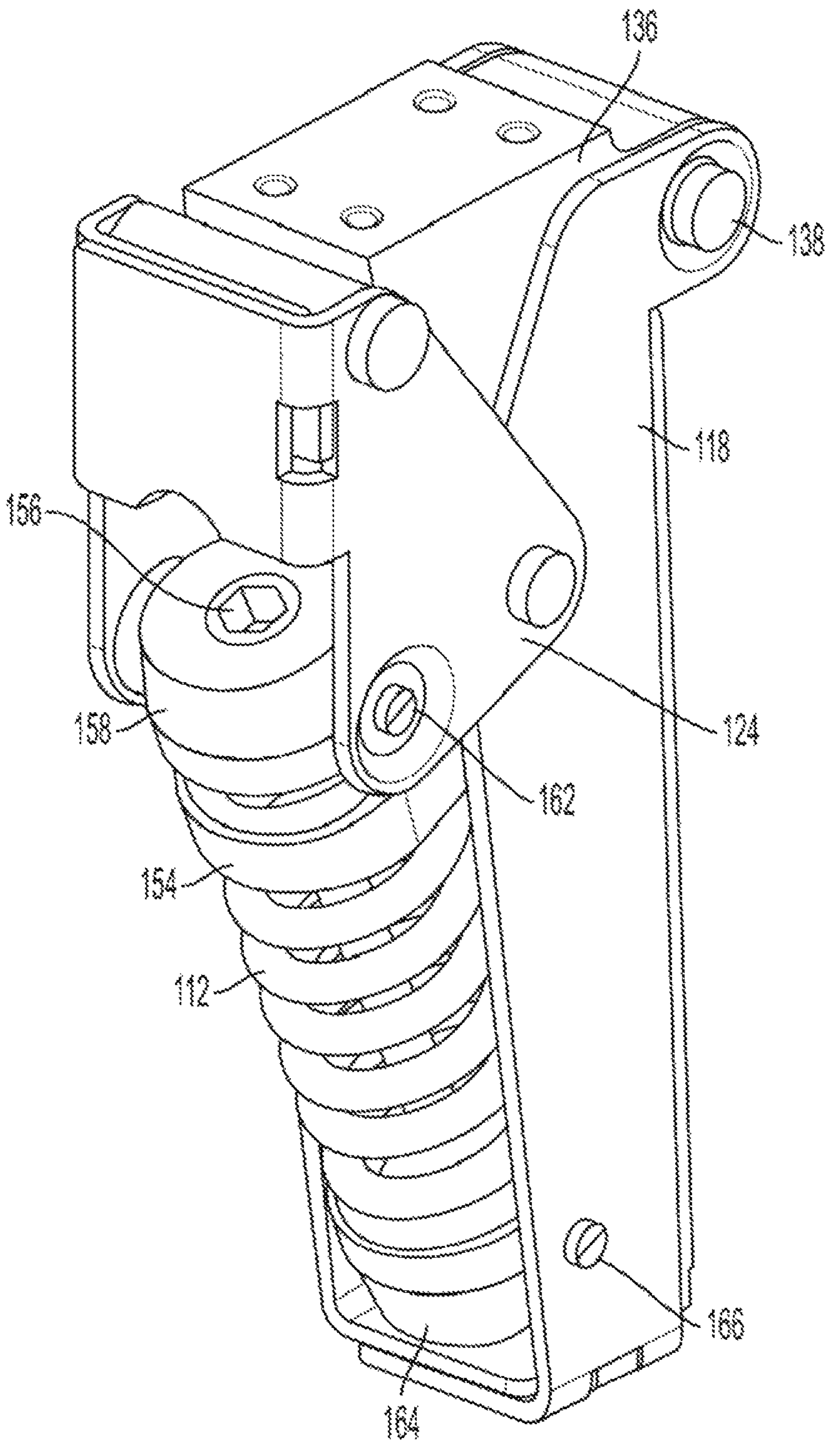
FIG. 12 is a perspective view of a fourth exemplary embodiment of the invention.

FIG. 12 shows a perspective view of a fourth embodiment counterbalance assembly 400. This fourth embodiment 400 has one compression spring 112. In this embodiment, the hinge point 138 has been merged with the cam 136. Thus, in this embodiment, the cam 136 is moveable and would be mounted to the truck hood 110 (not shown), while the mounting bracket 118 is fixed and would be mounted to the truck frame (not shown).

As described previously in connection with other embodiments spring 112 may be selected from a wide variety of spring types, including for example a mechanical spring (including for example a helical spring), a pneumatic spring (including for example a gas or air strut or piston), and a hydraulic spring (including for example a hydraulic strut or piston). One spring or a plurality of springs can be used as a means for exerting force. Specifically, in the fourth embodiment 400 illustrated in FIG. 12, the means for exerting force can be one or more mechanical springs.

Figure 13:
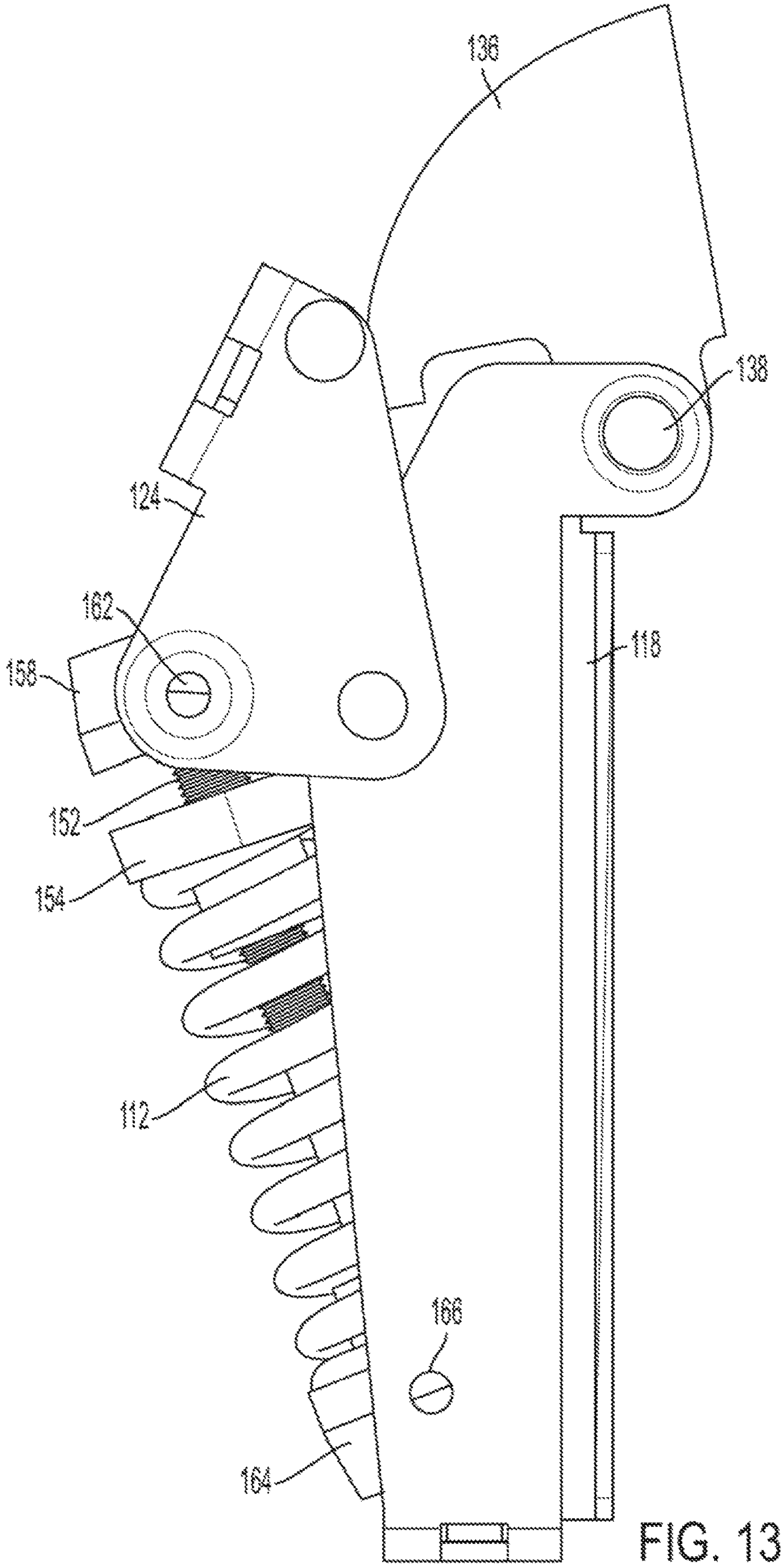
FIG. 13 is a side view of the fourth exemplary embodiment of the invention.

As shown in FIG. 13, which is a side view of the counterbalance assembly 400 in the opened position, the cam 136 rotates upward around the hinge point 138 when the truck hood 110 (not shown) is moved to the open position. Also shown in FIG. 13 is a socket head screw 152, as well as an upper collar 154. The screw 152 and the upper collar

154 are mutually threaded, such that when the screw 152 is rotated, the upper collar 154 is moved with respect to the screw 152. The upper collar 154 is configured and arranged such that it presses on the spring 112. Thus, when the screw 152 is rotated, the collar 154 moves up or down and thereby changes the preload on the spring 112, which changes the force that the spring 112 exerts. Note that the head 156 of the screw 152 is more clearly shown in the perspective view FIG. 12. Note also that the screw 152 also acts as a guide for the helical spring 112.

Shown in both FIG. 12 and FIG. 13 is a screw mount 158. The screw mount 158 is pivotally mounted to the follower arm 124 at a screw mount pivot point 162. Also shown in FIGS. 12 and 13 are a lower collar 164 which holds the spring 112 in pivotal relation at its lower end to the bracket 118.

Figure 14:
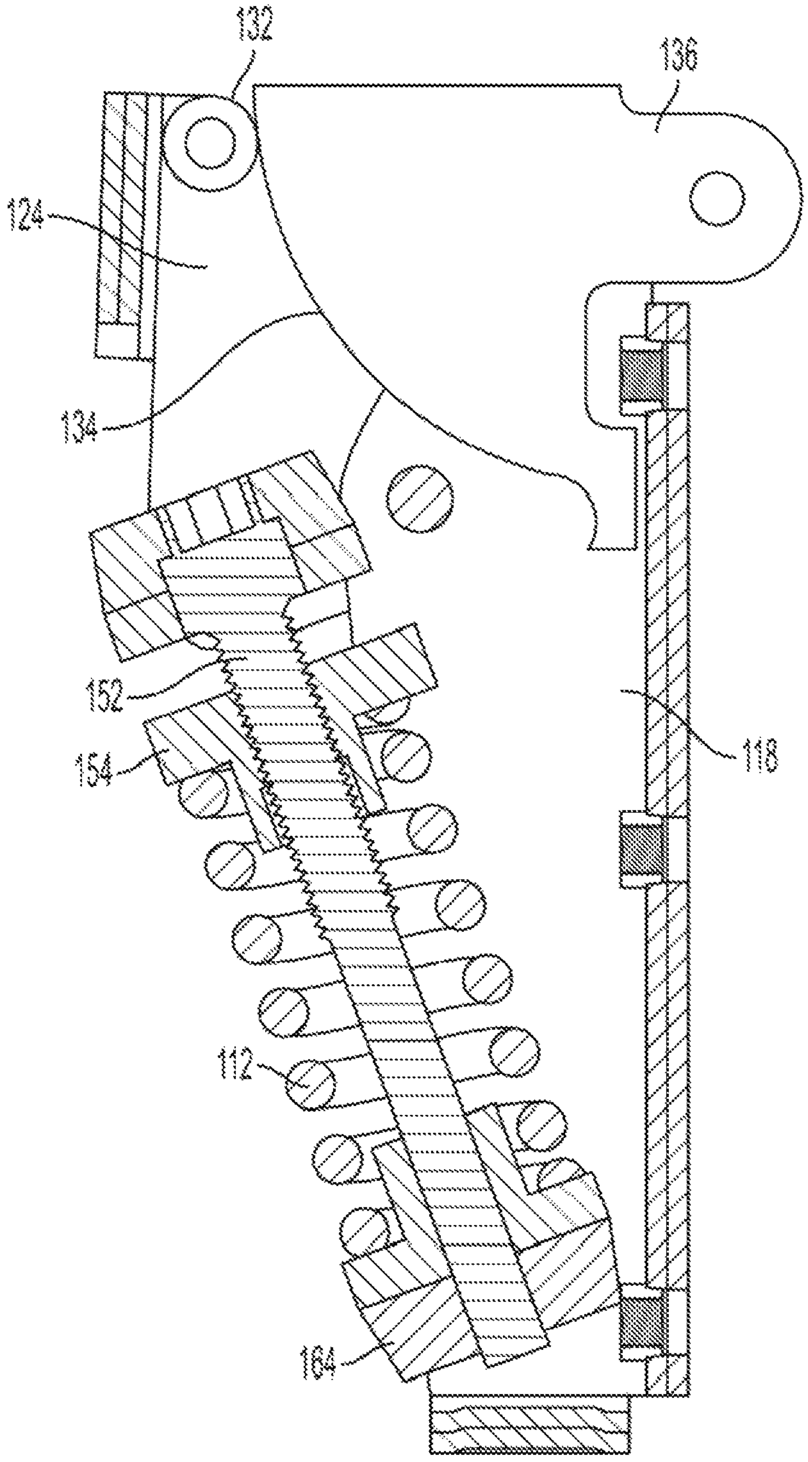
FIG. 14 is a cross-sectional view of the fourth embodiment of the invention in a closed position.
Figure 15:
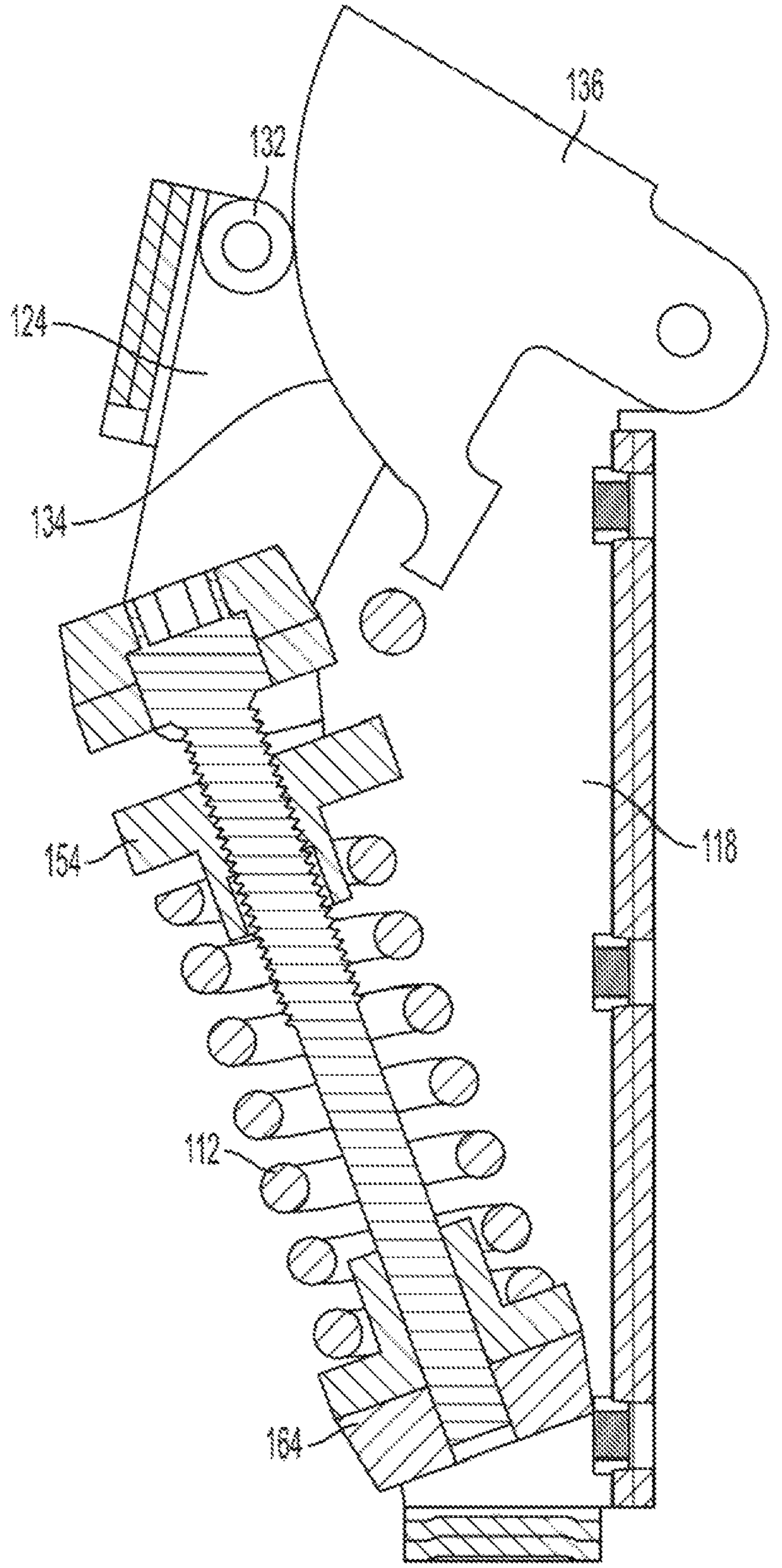
FIG. 15 is a cross-sectional view of fourth embodiment of the invention in a partially open position.
Figure 16:
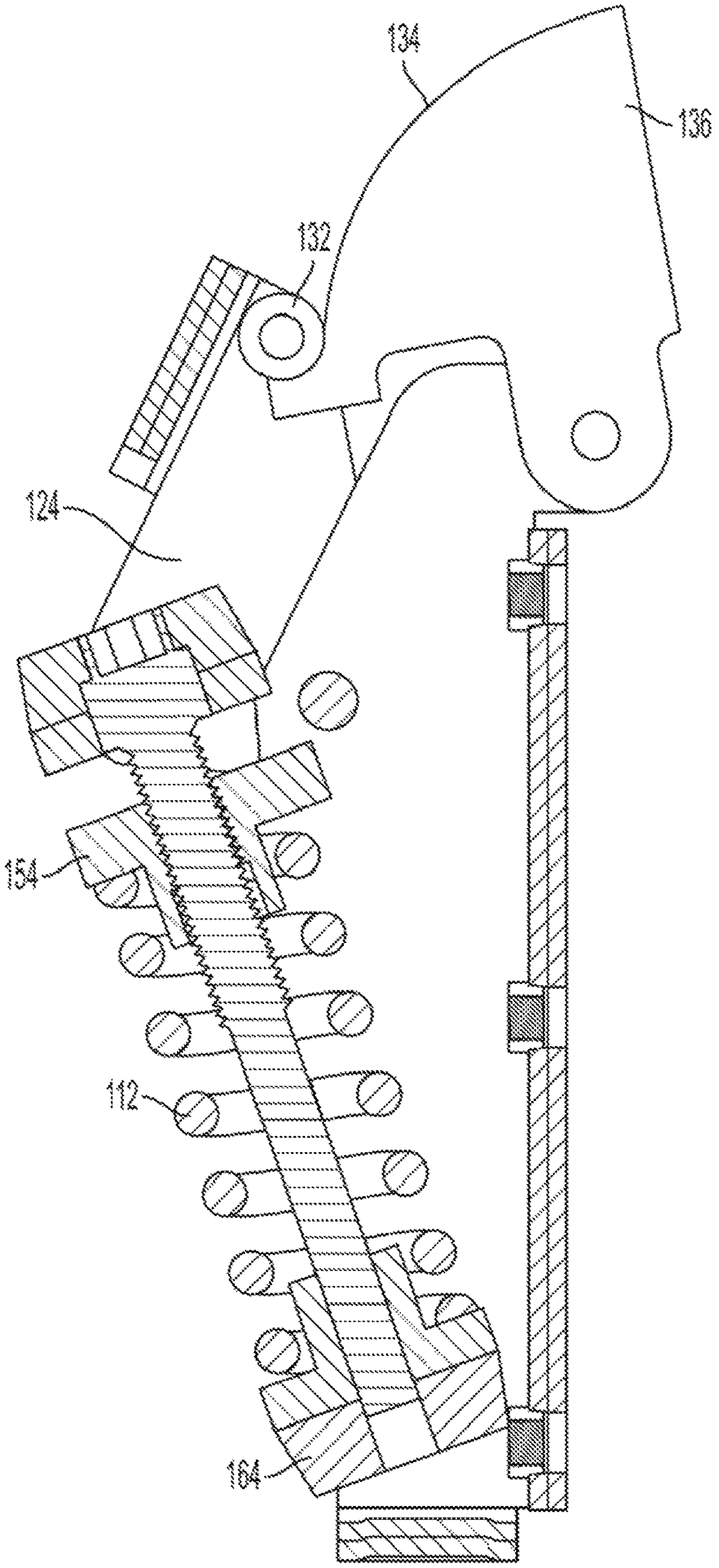
FIG. 16 is a cross-sectional view of the fourth embodiment of the invention in an open position.

Turn next to the series of cross-sectional views of counterbalance assembly 400 in FIGS. 14, 15 and 16, which show in cross-section, the movement of the assembly 400 as it is moved from the closed position in FIG. 14, to a partially open position in FIG. 15, to the open position in FIG. 16. As can be seen in these Figures, when the cam 136 rotates upward, the cam follower 132 moves along the cam profile 134, urged upwards by the force of the compression spring 112 between the lower collar 166 and the upper collar 154 that is attached to the follower arm 124.

Figure 17:
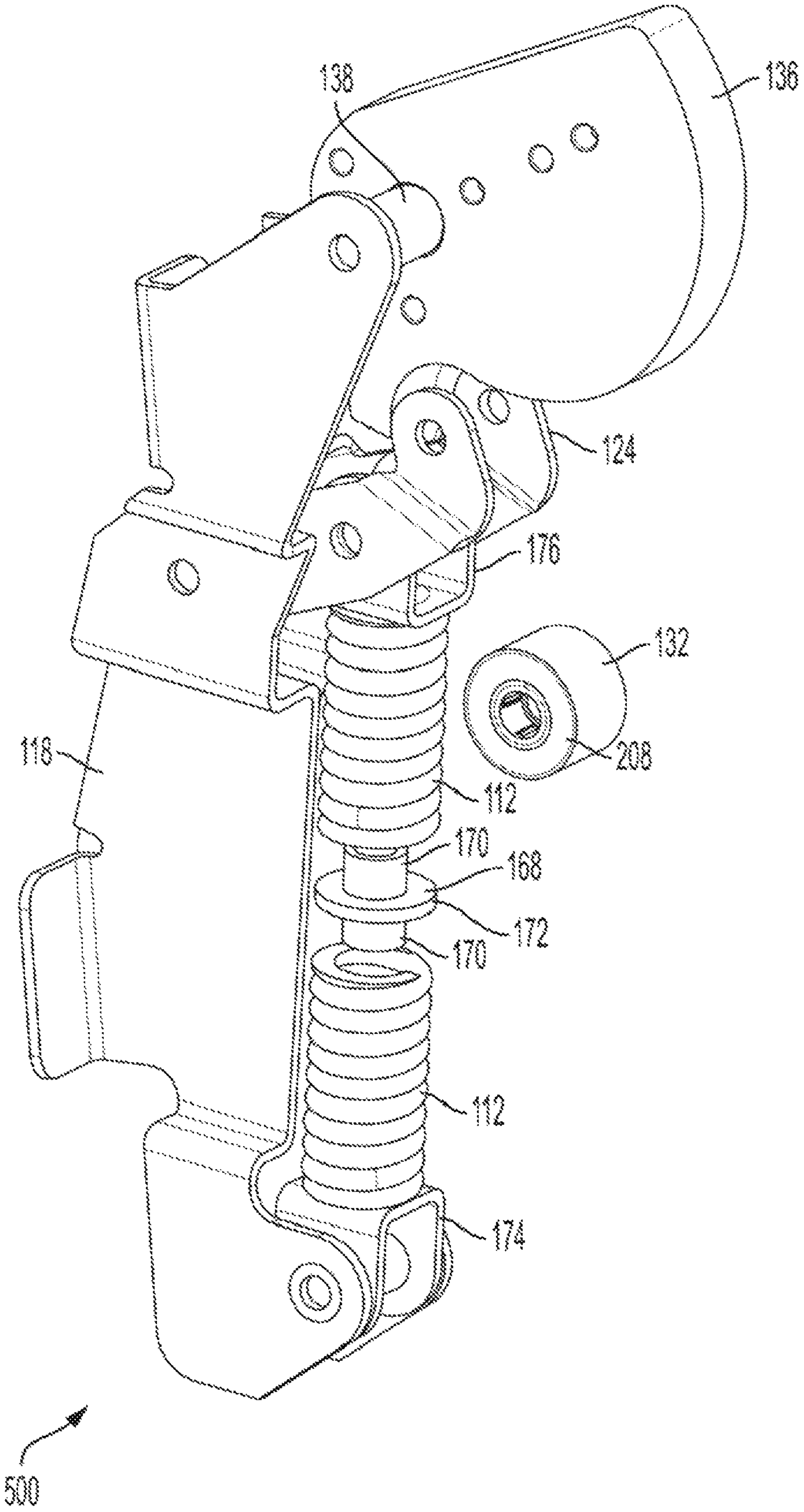
FIG. 17 is a partially exploded perspective view of a fifth embodiment of the invention.
Figure 18:
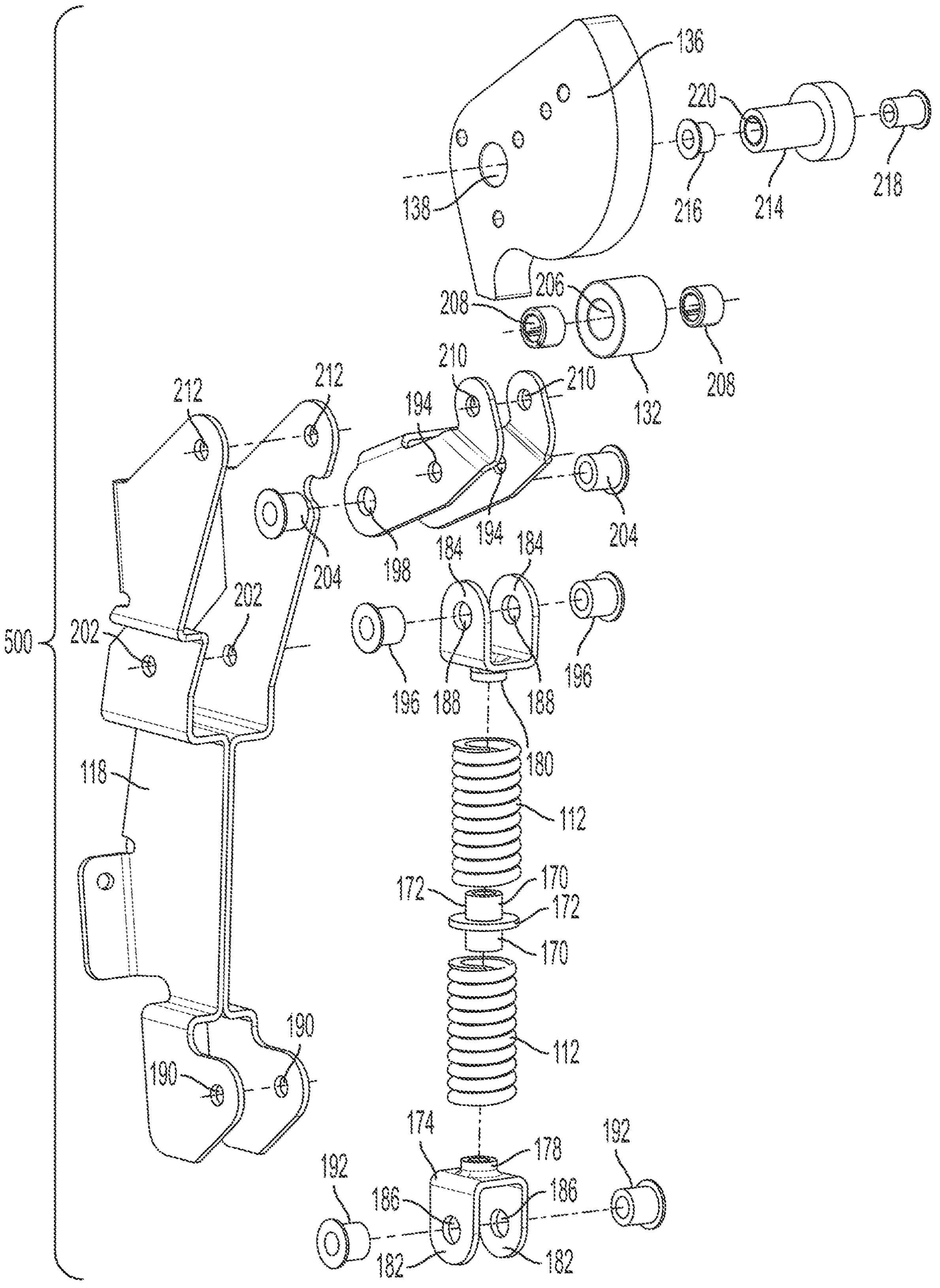
FIG. 18 is an exploded view of the fifth embodiment of the invention.

FIGS. 17 and 18 show a partially exploded perspective view and an exploded view, respectively, of an exemplary fifth embodiment of a counterbalance assembly 500.

Looking first at FIG. 17, the partially exploded view, it can be appreciated that, similar to the second embodiment (FIG. 8 is exemplary), there are two compression springs 112. However, in this embodiment, the two springs 112 are mounted in series, rather than in parallel, as they are in the second embodiment. In other words, the springs are generally aligned along a common axis as opposed to being aligned along separate generally parallel axes.

The two springs 112 may each have the same compressibility or different compressibility, thereby lending an additional adjustability factor to the counterbalance force that can be achieved with this system. Note that in this partially exploded view FIG. 17, there can be seen a spring connector 168 which is located between the two springs 112. The spring connector 168 is constructed and arranged to hold the two springs 112 in fixed, coaxial relation to each other. While for clarity, the springs 112 in FIG. 17 are shown as not being in contact with one another, in practice, the spring connector 168 has two projections 170, each emerging from an opposite side of an annular flange 172. The projections 170 are constructed and arranged to fit into the center of each spring 112 and the flange 172 is thus pressed tightly between the two springs 112. The two springs 112 are thus held together along a common axis. The spring connector 168 thus enables the force from both springs 112 to be transferred therebetween.

Note also that the follower 132 in FIG. 17 is not shown in its appropriate position as rotatably attached to the follower arm 124. Also seen in this partially exploded view are the cam 136 which is rotatably mounted to the spring mounting bracket 118 at the cam hinge point 138. There are also shown in FIG. 17, a bracket spring tip 174 and a follower arm spring tip 176. These spring tips 174 and 176 allow the springs 112 to be rotatably mounted to the bracket 118 and the follower arm 124, respectively.

Looking next at the exploded view of this fifth embodiment counterbalance system 500 shown in FIG. 18, one can see that the spring tips 174 and 176 each have a projection 178, 180, respectively, that are constructed and arranged to fit into the center of the springs 112, in a manner analogous to the projections 170 on the spring connector 168. Each spring tip 174 and 176 has a set of legs 182, 184, respectively, and each of these legs 182, 184 has through holes 186, 188 respectively.

As can be seen by examining FIG. 18, the through holes 186 are arranged to coincide with through holes 190 in the spring mounting bracket 118. A set of flanged bearings 192 is thus constructed and arranged to mount into both sets of through holes 186 and 190, thereby rotatably coupling together the springs 112 and the bracket 118, via the bracket spring tip 174. In a similar manner, there are a pair of through holes 194 in the follower arm 124 which are arranged to coincide with the through holes 186 in the follower arm spring tip 176. Flanged bearings 196 are thus constructed and arranged to mount into both sets of through holes 186 and 194, thereby rotatably coupling together the springs 112 and the follower arm 124, via the bracket spring tip 176.

As seen in the exploded view FIG. 18, the follower arm 124 has a second set of through holes 198 (only one is visible). These through holes 198 coincide with a set of through holes 202 in the bracket 118. A set of flanged bearings 204 are constructed and arranged to fit into the through holes 198 and 202, thereby rotatably coupling together the follower arm 124 and the bracket 118. The follower 132 in this embodiment can be seen to be in the form of a roller. The follower 132, as shown in the exploded view FIG. 18 has a through hole 206, which a set of bearings 208 fits into. The follower arm 124 has a set of through holes 210 that are constructed and arranged to coincide with the bearings 208 located in the follower through hole 206. An axle (not shown) is provided that is located in the bearings 208 and the through holes 210 and thus rotatably couples the follower 132 with the follower arm 124.

Looking at the partially exploded view FIG. 17, one may observe that the cam 136 is rotatably coupled to the bracket 118 at hinge point 138. The hinge point 138 on the cam 136 comprises a through hole. There is a pair of through holes 212 in the bracket 118. The pair of through holes 212 are arranged to coincide with the hinge point/through hole 138 in the cam 136. Also shown in FIG. 18 are a hub 214, as well as two flanged bearings 216, 218. The hub 214 comprises a through hole 220. The hub 214 fits into the through holes 212 in the bracket 118, and the hinge point/cam through hole 138, thus rotatably coupling together the cam 136 and the bracket 118. The two flanged bearings 216, fit into the through holes 212 and then into through hole 220 in the hub 214, and thus serve to prevent the hub 214 from sliding loose from the bracket 118.

Like the other counterbalance assembly embodiments disclosed herein, a person having skill in the art can appreciate that in an embodiment, the bracket 118 may be mounted to a fixed element of a system, such as a hatch opening in a tank, to cite a non-limiting example. The cam 136, which rotates with respect to the bracket 118 could be mounted to a cover for the hatch opening, which would rotate open and closed. Alternatively, the bracket 118 may be mounted to the rotatable element of a counterbalanced system, while the cam 136 may be mounted to the fixed element of a counterbalanced system.

Thus, the principle of operation of this fifth embodiment is therefore for the springs 112 to apply a counterbalancing force, via their rotatable attachment to the follower 132 via the follower arm 124, to the cam 136 and thence to the hatch cover (as a non-limiting example), or other rotatable element of a system. The cam surface 134 in an embodiment can be shaped and configured so that in conjunction with selection of appropriate springs 112, for instance, the weight of the hatch cover may be made to feel weightless throughout its travel. This principle also applies in the case when in the bracket 118 is attached to the rotatable hatch cover and the cam 136 is attached to the fixed element such as a side of the hatch.

Figure 19:
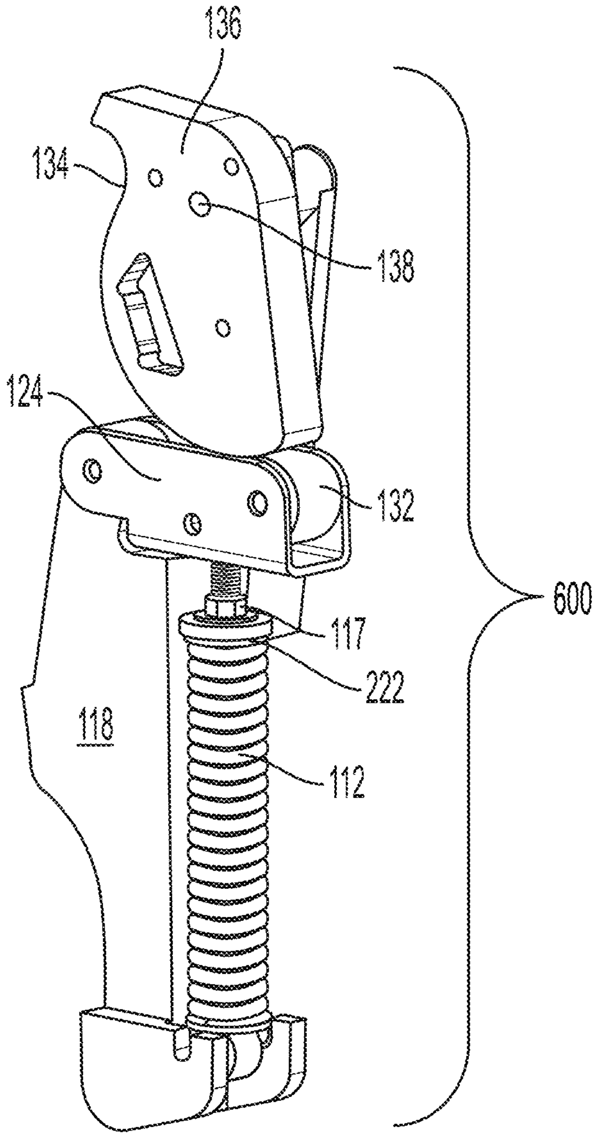
FIG. 19 is a perspective view of a sixth embodiment of the invention in a closed position.
Figure 20:
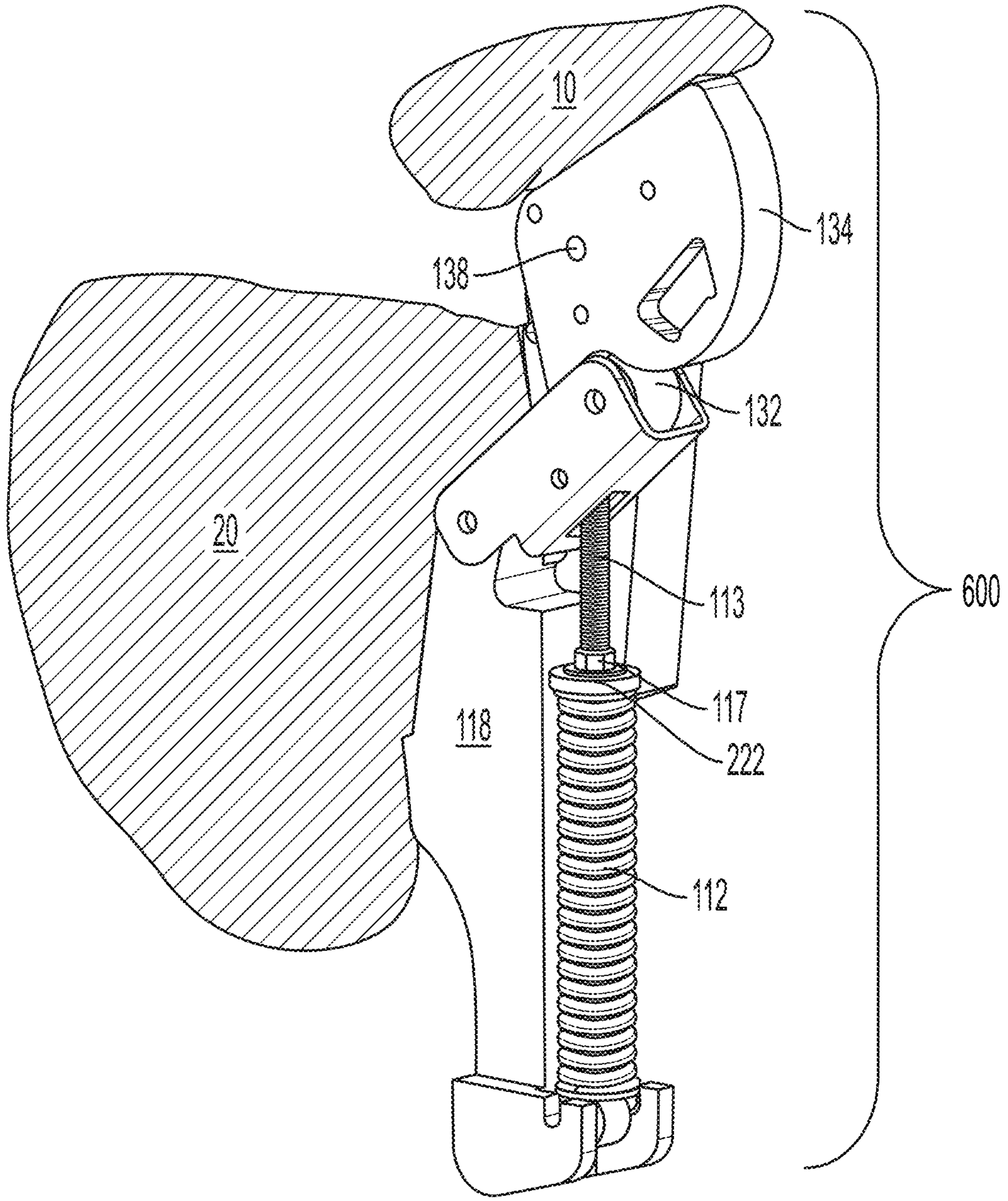
FIG. 20 is a perspective view of the sixth embodiment of the invention in an open position.

A sixth embodiment counterbalance assembly 600 is shown in perspective views in FIG. 19 and FIG. 20. FIG. 19 shows the assembly 600 in the closed position and FIG. 20 shows the assembly 600 in the open position. FIG. 20 also shows schematically, the components 10, 20 of the counterbalanced system that are to be moved pivotably with respect to each other.

As shown in FIG. 20, component 10 is attached to the cam 136 and component 20 is attached to the bracket. In overview, this sixth embodiment counterbalance system 600 is much like the other five embodiments 100, 200, 300, 400 and 500, in that this sixth embodiment 600 comprises the components of the cam 136, the follower arm 124, and the follower 132, which travels along the cam profile 134 on the cam 136. The cam 136 is rotatably attached to the bracket 118 at the hinge point 138.

Note that in this sixth embodiment 600 the bracket 118 is not symmetric and thus the cam 136 is attached on one side only. This embodiment 600 also comprises the spring 112 which is rotatably mounted between the spring mounting bracket 118 at its lower end and the follower arm 124. This sixth embodiment also comprises the telescoping spring guide 113, also discussed in the first embodiment 100. As shown, one may appreciate that the bracket 118 may be, in a non-limiting embodiment, fixedly mounted to component 20 which may be a gaming machine housing, while the cam 136, which moves, may be fixedly attached to component 10, which may be a display for the gaming machine. Thus, in an embodiment, the counterbalance assembly 600 may be used to counterbalance the weight of the relatively heavy gaming machine display, so that the display may be easily moved relative to the gaming machine housing so that the display is not in the way for servicing of the electronics, and other equipment in the interior of the gaming machine.

One may appreciate that the sixth embodiment counterbalance assembly 600 can be mounted to the exemplary gaming machine in the opposite manner, i.e., the bracket 118 could be mounted to the display for the gaming machine which then is represent by component 20, while the cam 136 could be mounted to the housing of the gaming machine represented by component 10.

As can be seen in both FIG. 19 and FIG. 20, in this embodiment 600, the spring guide 113 is threaded. This embodiment, like the first embodiment 100, comprises the adjustment nut 117. The adjustment nut 117 is threaded such that it may be rotated and moved up and down the spring guide 113. Looking again at FIGS. 19 and 20, there is seen a washer 222. The washer 222 is arranged between the spring 112 and the nut 117. Thus, looking at the perspective views in FIGS. 19 and 20, one may appreciate that as the nut 117 is moved up and down on the spring guide 113, the preload on the spring 112 is thereby adjusted. Thus the counterbalance force that the spring 112 can apply to the follower 132 via the rotatable attachment of the spring guide 113 to the follower arm 124 and thence to the cam 136 via the cam profile 134 may be adjusted as desired, even while the counterbalance assembly is attached to the gaming machine and its display.

The shape of a particular cam profile for any of the embodiments disclosed herein may be optionally generated using an algorithm into which variables are input. For example, the force applied by the compression spring(s) or other means, the weight of the movable component, the location of the center of gravity of the movable component, the location of the theoretical or actual point of rotation, and other variables can be input into an algorithm to generate the shape of the cam profile.

Various exemplary aspects of the invention may be summarized as follows:

Aspect 1: An assembly (100, 200, 300, 400, 500, 600) configured to counterbalance components (10, 20) movable relative to one another, the assembly (100, 200, 300, 400, 500, 600) comprising:
- a mounting bracket 118 configured to be coupled to one of the components (10, 12);
- a follower arm (124) pivotally coupled to a follower arm mounting point on the mounting bracket (118);
- a follower (132) coupled to a follower mounting point on the follower arm (124);
- means for exerting force (112) between a force exerting means mounting point on the mounting bracket and a force exerting means mounting point on the follower arm; and
- a cam (136) configured to be coupled to another one of the components (10, 20) in such a way that the follower contacts a cam profile (134) of the cam (136).

Aspect 2: The assembly (100, 200, 300, 400, 500, 600) of Aspect 1, the means for exerting force (112) being selected from the group consisting of at least one mechanical spring, at least one pneumatic spring, and at least one hydraulic spring.

Aspect 3: The assembly (100, 200, 300, 400, 500, 600) of Aspect 2, the means for exerting force (112) being at least one mechanical spring.

Aspect 4: The assembly (100, 200, 300, 400, 500, 600) of Aspect 3, the at least one mechanical spring being a compression spring or compression springs interposed between the mounting point on the mounting bracket and the mounting point on the follower arm.

Aspect 5: The assembly (100, 200, 300, 400, 500, 600) of Aspect 3, further comprising a spring guide (113) positioned to guide at least one of the at least one spring (112).

Aspect 6: The assembly (100, 200, 300, 400, 500, 600) of Aspect 1, the cam profile (134) further comprising a detent.

Aspect 7: The assembly (100, 200, 300, 400, 500, 600) of Aspect 1, wherein the follower (132) comprises a roller.

Aspect 8: A counterbalanced system comprising:
- components (10, 20) movable relative to one another; and
- at least one assembly (100, 200, 300, 400, 500, 600) counterbalancing the components (10, 20) relative to one another, the at least one assembly (100, 200, 300, 400, 500, 600) having
  - a mounting bracket (118) coupled to one of the components (10, 20),
  - a follower arm (124) pivotally coupled to a follower arm mounting point on the mounting bracket (118),
  - a follower (132) coupled to a follower mounting point on the follower arm (124),
  - means for exerting force (112) between a force exerting means mounting point on the mounting bracket (118) and a force exerting means mounting point on the follower arm (124), and
  - a cam (136) coupled to another one of the components (10, 20) in such a way that the follower (132) contacts a cam profile (134) of the cam (136);

wherein the at least one assembly (100, 200, 300, 400, 500, 600) facilitates movement of the components (10, 20) relative to one another.

Aspect 9: The counterbalanced system of Aspect 8, wherein one of the components (10, 20) is a vehicle panel and the other of the components (10, 20) is a vehicle.

Aspect 10: The counterbalanced system of Aspect 9, wherein the vehicle panel comprises a vehicle hood.

Aspect 11: The counterbalanced system of Aspect 8, wherein the counterbalanced system is a gaming machine and one of the components (10, 20) is a gaming machine display and the other of the components (10, 20) is a housing of the gaming machine.

Aspect 12: The counterbalanced system of Aspect 8, wherein one of the components (10, 20) is oriented at an angle with respect to a horizontal plane in a first position and is movable relative to the other one of the components (10, 20) to be oriented at a smaller angle with respect to the horizontal plane in a second position.

Aspect 13: The counterbalanced system of Aspect 12, wherein the component (10, 20) oriented at the angle with respect to the horizontal plane in the first position is oriented substantially vertically.

Aspect 14: The counterbalanced system of Aspect 8, wherein the components (10, 20) are pivotally coupled relative to one another in addition to being coupled by the at least one assembly.

Aspect 15: The assembly (100, 200, 300, 400, 500, 600) of Aspect 1, the means for exerting force (112) being a spring.

Aspect 16: The assembly (100, 200, 300, 400, 500, 600) of Aspect 15, the spring being selected from the group consisting of at least one mechanical spring, at least one pneumatic spring, and at least one hydraulic spring.

Aspect 17: The assembly (100, 200, 300, 400, 500, 600) of Aspect 16, the mechanical spring comprising a helical spring.

Aspect 18: The assembly (100, 200, 300, 400, 500, 600) of Aspect 17, the force exerted by the helical spring being adjustable.

Aspect 19: The assembly (100, 200, 300, 400, 500, 600) of Aspect 18, the force exerted by the helical spring being adjustable with a screw (152).

Aspect 20: The assembly of Aspect 18, the force exerted by the helical spring being adjustable with a nut (117).

Aspect 21: The assembly (100, 200, 300, 400, 500, 600) of Aspect 16, the pneumatic spring comprising a pneumatic cylinder or an air spring.

Aspect 22: The assembly (100, 200, 300, 400, 500, 600) of Aspect 16, the hydraulic spring comprising a hydraulic cylinder.

Aspect 23: An assembly (100, 200, 300, 400, 500, 600) configured to counterbalance components (10, 20) movable relative to one another, the assembly (100, 200, 300, 400, 500, 600) comprising:

- a mounting bracket (118) configured to be coupled to one of the components (10, 20);
- a follower arm (124) pivotally coupled to a follower arm mounting point on the mounting bracket (118);
- a follower (132) coupled to a follower mounting point on the follower arm (124);
- a spring (112) positioned to exert a force between a spring mounting point on the mounting bracket (118) and a spring mounting point on the follower arm (124); and
- a cam (136) configured to be coupled to another one of the components (10, 20) in such a way that the follower (132) contacts a cam profile (134) of the cam (136).

Aspect 24: The assembly (100, 200, 300, 400, 500, 600) of Aspect 23, the spring (112) being selected from the group consisting of at least one mechanical spring, at least one pneumatic spring, and at least one hydraulic spring.

Aspect 25: The assembly (100, 200, 300, 400, 500, 600) of Aspect 24, the at least one spring (112) being at least one mechanical spring and the force between the spring mounting point on the mounting bracket and the spring mounting point on the follower arm being adjustable.

Aspect 26: The assembly (100, 200, 300, 400, 500, 600) of Aspect 25, the at least one mechanical spring (112) being at least one helical spring and the force being adjustable with at least one screw (152).

Aspect 27: The assembly of (100, 200, 300, 400, 500, 600) Aspect 25, the at least one mechanical spring (152) being at least one helical spring and the force being adjustable with at least one nut (117).

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An assembly configured to counterbalance components movable relative to one another, the assembly comprising:

- a mounting bracket configured to be coupled to one of the components;
- a follower arm pivotally coupled to a follower arm mounting point on the mounting bracket;
- a follower coupled to a follower mounting point on the follower arm;
- means for exerting force between a force exerting means mounting point pivotally mounted on the mounting bracket and a force exerting means mounting point on the follower arm;
- a cam configured to be fixedly coupled to another one of the components in such a way that the follower contacts a cam profile of the cam; and
- wherein a force exerted by the means for exerting force is amplified or minimized as the follower translates over the cam profile, and the relationship between the point at which the cam profile acts on the follower and the point at which force from the means for exerting force acts on the follower creates a counteracting force relative to a point of rotation in the assembly.

2. The assembly of claim 1, the means for exerting force being selected from the group consisting of at least one mechanical spring, at least one pneumatic spring, and at least one hydraulic spring.

3. The assembly of claim 2, the means for exerting force being at least one mechanical spring.

4. The assembly of claim 3, the at least one mechanical spring being a compression spring or compression springs interposed between the mounting point on the mounting bracket and the mounting point on the follower arm.

5. The assembly of claim 3, further comprising a spring guide positioned to guide at least one of the at least one spring.

6. The assembly of claim 1, the cam profile further comprising a detent.

7. The assembly of claim 1, wherein the follower comprises a roller.

8. The assembly of claim 1, the means for exerting force being a spring.

9. The assembly of claim 8, the spring being selected from the group consisting of at least one mechanical spring, at least one pneumatic spring, and at least one hydraulic spring.

10. The assembly of claim 9, the mechanical spring comprising a helical spring.

11. The assembly of claim 10, the force exerted by the helical spring being adjustable.

12. The assembly of claim 11, the force exerted by the helical spring being adjustable with a screw.

13. The assembly of claim 11, the force exerted by the helical spring being adjustable with a nut.

14. The assembly of claim 9, the pneumatic spring comprising a pneumatic cylinder or an air spring.

15. The assembly of claim 9, the hydraulic spring comprising a hydraulic cylinder.

16. A counterbalanced system comprising:

components movable relative to one another; and at least one assembly counterbalancing the components relative to one another, the at least one assembly having a mounting bracket coupled to one of the components, a follower arm pivotally coupled to a follower arm mounting point on the mounting bracket, a follower coupled to a follower mounting point on the follower arm, means for exerting force between a force exerting means mounting point pivotally mounted on the mounting bracket and a force exerting means mounting point on the follower arm, and a cam fixedly coupled to another one of the components in such a way that the follower contacts a cam profile of the cam;

wherein the at least one assembly facilitates movement of the components relative to one another; and wherein a force exerted by the means for exerting force is amplified or minimized as the follower translates over the cam profile, and the relationship between the point at which the cam profile acts on the follower and the point at which force from the means for exerting force acts on the follower creates a counteracting force relative to a point of rotation in the assembly.

17. The counterbalanced system of claim 16, wherein one of the components is a vehicle panel and the other of the components is a vehicle.

18. The counterbalanced system of claim 17, wherein the vehicle panel comprises a vehicle hood.

19. The counterbalanced system of claim 16, wherein the counterbalanced system is a gaming machine and one of the components is a gaming machine display and the other of the components is a housing of the gaming machine.

20. The counterbalanced system of claim 16, wherein one of the components is oriented at an angle with respect to a horizontal plane in a first position and is movable relative to the other one of the components to be oriented at a smaller angle with respect to the horizontal plane in a second position.

21. The counterbalanced system of claim 20, wherein the component oriented at the angle with respect to the horizontal plane in the first position is oriented substantially vertically.

22. The counterbalanced system of claim 16, wherein the components are pivotally coupled relative to one another in addition to being coupled by the at least one assembly.

23. An assembly configured to counterbalance components movable relative to one another, the assembly comprising:

a mounting bracket configured to be coupled to one of the components;

a follower arm pivotally coupled to a follower arm mounting point on the mounting bracket;

a follower coupled to a follower mounting point on the follower arm;

a spring positioned to exert a force between a spring mounting point pivotally mounted on the mounting bracket and a spring mounting point on the follower arm;

a cam configured to be fixedly coupled to another one of the components in such a way that the follower contacts a cam profile of the cam; and wherein a force exerted by the means for exerting force is amplified or minimized as the follower translates over the cam profile, and the relationship between the point at which the cam profile acts on the follower and the point at which force from the means for exerting force acts on the follower creates a counteracting force relative to a point of rotation in the assembly.

24. The assembly of claim 23, the spring being selected from the group consisting of at least one mechanical spring, at least one pneumatic spring, and at least one hydraulic spring.

25. The assembly of claim 24, the at least one spring being at least one mechanical spring and the force between the spring mounting point on the mounting bracket and the spring mounting point on the follower arm being adjustable.

26. The assembly of claim 25, the at least one mechanical spring being at least one helical spring and the force being adjustable with at least one screw.

27. The assembly of claim 25, the at least one mechanical spring being at least one helical spring and the force being adjustable with at least one nut.

* * * * *